(12) United States Patent
Mizuta et al.

(10) Patent No.: US 7,499,737 B2
(45) Date of Patent: Mar. 3, 2009

(54) FOLDABLE PORTABLE INFORMATION TERMINAL

(75) Inventors: Masatomo Mizuta, Tokyo (JP); Kazuo Ohtsuta, Tokyo (JP); Kiyoshi Kohayakawa, Tokyo (JP); Michio Nagai, Tokyo (JP); Mika Fujii, Tokyo (JP); Masaki Shimamura, Tokyo (JP); Mitsuru Sendouda, Tokyo (JP)

(73) Assignee: NEC Corporation, Tokyo (JP)

( * ) Notice: Subject to any disclaimer, the term of this patent is extended or adjusted under 35 U.S.C. 154(b) by 275 days.

(21) Appl. No.: 10/259,509

(22) Filed: Sep. 30, 2002

(65) Prior Publication Data

US 2003/0064758 A1    Apr. 3, 2003

(30) Foreign Application Priority Data

Sep. 28, 2001  (JP)  ............................. 2001-303959
Jun. 28, 2002  (JP)  ............................. 2002-189488

(51) Int. Cl.
H04B 1/36    (2006.01)

(52) U.S. Cl. ................. 455/575.3; 455/566; 455/550.1; 455/575.1; 455/575.4; 455/575.7; 16/367; 16/334

(58) Field of Classification Search ............... 455/550.1, 455/556, 557, 566, 575, 90, 575.1, 575.2, 455/575.3, 575.4, 90.1, 556.1, 575.7, 575.8; 16/367, 334
See application file for complete search history.

(56) References Cited

U.S. PATENT DOCUMENTS

| | | | | |
|---|---|---|---|---|
| 5,206,790 A | * | 4/1993 | Thomas et al. | ............... 361/681 |
| 5,485,517 A | * | 1/1996 | Gray | ....................... 379/433.13 |
| 6,269,256 B1 | | 7/2001 | Nakamura | |
| 6,549,789 B1 | * | 4/2003 | Kfoury | ...................... 455/550.1 |
| 6,766,182 B2 | * | 7/2004 | Janninck et al. | ........... 455/575.3 |
| 6,839,576 B2 | * | 1/2005 | Aagaard et al. | ............ 455/575.1 |
| 6,850,784 B2 | * | 2/2005 | SanGiovanni | ............. 455/575.1 |
| 6,867,961 B2 | * | 3/2005 | Choi | ........................... 361/681 |
| 2003/0052857 A1 | * | 3/2003 | Pappas | ........................ 345/156 |
| 2005/0107138 A1 | * | 5/2005 | SanGiovanni | ............. 455/575.1 |

FOREIGN PATENT DOCUMENTS

| | | |
|---|---|---|
| EP | 0 661 823 A1 | 7/1995 |
| GB | 2 349 784 A | 11/2000 |
| JP | 64-080145 | 3/1989 |
| JP | 5-211547 | 8/1993 |
| JP | 7-202748 | 8/1995 |

(Continued)

OTHER PUBLICATIONS

Japanese Office Action dated Dec. 7, 2004, with partial English Translation.

(Continued)

*Primary Examiner*—Vincent P. Harper
*Assistant Examiner*—Khai M Nguyen
(74) *Attorney, Agent, or Firm*—McGinn IP Law Group, PLLC

(57) ABSTRACT

A foldable portable information terminal includes an upper unit having a display unit on its one side, a lower unit having operation keys on its one side, and a movable connecting mechanism connecting the upper unit and the lower unit allowing the upper unit to be opened, closed, and freely rotated with respect to a longitudinal direction of the lower unit. The displaying mode of the display unit whose direction varies depending on a position of the upper unit is changed depending on a positional relationship of the upper unit and the lower unit.

35 Claims, 14 Drawing Sheets

FOREIGN PATENT DOCUMENTS

| | | | |
|---|---|---|---|
| JP | 08-097891 | | 4/1996 |
| JP | 08-149189 | | 6/1996 |
| JP | 09-232769 | | 9/1997 |
| JP | 10-065778 | | 3/1998 |
| JP | 11-30226 | | 2/1999 |
| JP | 11-215218 | | 8/1999 |
| JP | 11-247837 | | 9/1999 |
| JP | 2000-64701 | | 2/2000 |
| JP | 2000-064701 | * | 2/2000 |
| JP | 2000-196720 | | 7/2000 |
| JP | 2000-295337 | | 10/2000 |
| JP | 2001-022472 | | 1/2001 |
| JP | 2001-127855 | | 5/2001 |
| JP | 2001-156893 | | 6/2001 |
| JP | 2001-169166 | | 6/2001 |
| JP | 2001-241254 | | 9/2001 |
| JP | 2001-251406 | | 9/2001 |
| JP | 2001-268203 | | 9/2001 |
| JP | 2002-135380 | | 5/2002 |
| JP | 2002-158758 | | 5/2002 |
| JP | 2002-344596 | * | 11/2002 |
| WO | WO 01/84269 A2 | | 11/2001 |

OTHER PUBLICATIONS

Japanese Office Action dated Apr. 19, 2005, with Partial English Translation.

European Search Report dated Mar. 12, 2004.

Japanese Office Action dated Dec. 6, 2005 (with partial English translation).

Japanese Office Action dated Apr. 11, 2006 (with partial English translation).

Japanese Office Action dated Sep. 25, 2008 with a partial English translation.

* cited by examiner

FIG.12A
FIG.12B
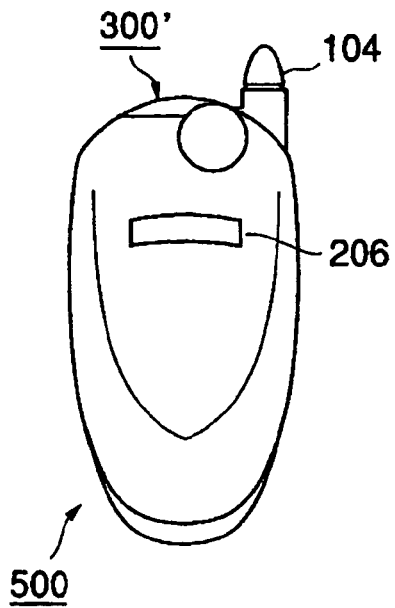
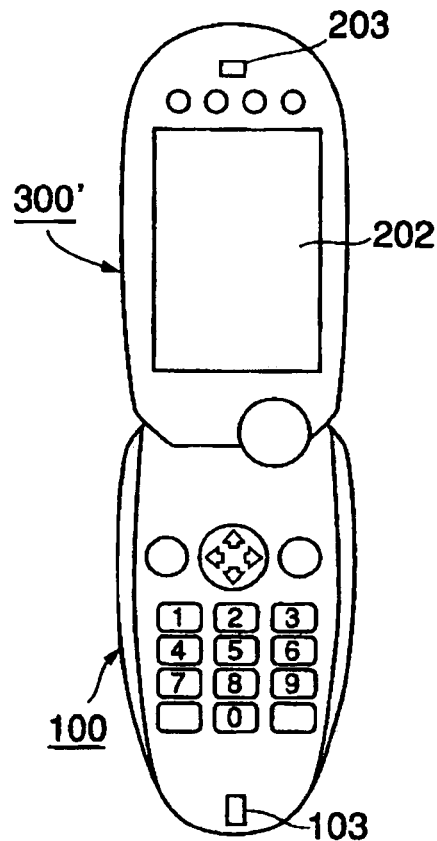
FIG.12C
FIG.12D
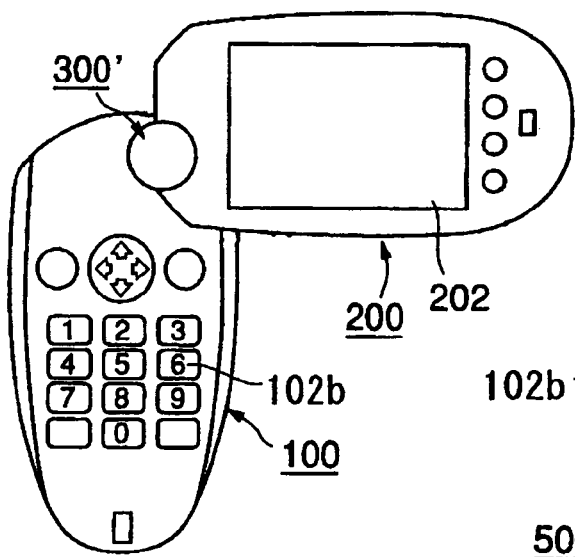
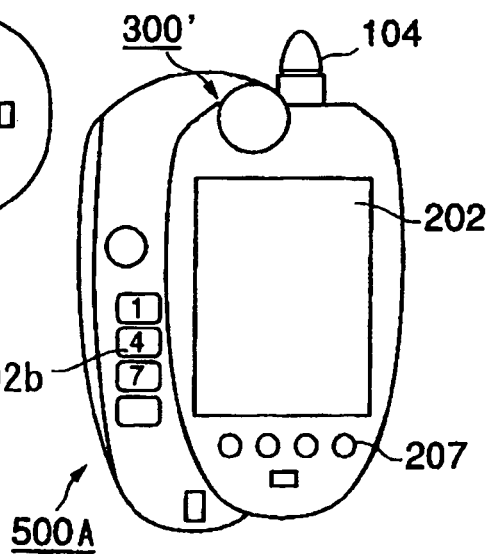

|   | UPPER/LOWER UNIT STOP POSITION | DISPLAY TOUCH PANEL ENABLE AREA |
|---|---|---|
| (1) | OPEN [b] | LOWER PORTION OF VERTICALLY ORIENTED DISPLAY |
| (2) | DISPLAY IN HORIZONTAL ORIENTATION [c] | LOWER PORTION OF HORIZONTALLY ORIENTED DISPLAY |
| (3) | CLOSE (DISPLAY OUTSIDE) [d] | FULL SCREEN |

FOLDABLE PORTABLE INFORMATION TERMINAL

BACKGROUND OF THE INVENTION

1. Field of the Invention

The present invention relates to a portable information terminal such as a portable telephone and a personal digital terminal, and in particular to a portable information terminal of a novel foldable structure that has an unprecedented function by further developing a foldable structure.

2. Description of the Related Art

Conventionally, a straight type and a foldable type have been used for the structure of a portable information terminal, particularly a portable telephone. Among others, a portable telephone of a foldable structure type has been widely used and the demand for this has expanded because it can be accommodated in compact.

A typical example of the foldable portable telephone, as shown in FIG. 1, is provided with a substantially oblong lower unit 100' disposed with an operation section 102' and an upper unit 200' of substantially the same shape having a rectangular display section 202', which are engaged together so as to be able to be freely opened and closed, by rotatably and axially connecting linear portions at respective one end of both units with a connection member 300' such that a operation section surface 101a faces a display unit fitting section 201a. In general, a display unit has a sufficient length in its longitudinal axis direction in order to take a large display area. Further, the directions of a operation section and display contents are determined with respect to a state where the operation section is positioned downward (frontward) at the open time.

A portable telephone has come to be utilized as a portable information terminal that has additional functions of a browser of the Internet, an e-mail transmission/reception terminal, and a schedule management, not only communications. Therefore, the display contents are wide including large quantity of character information and images, and increase in sizes of a display unit has been progressed.

According to the conventional portable telephone of a representative foldable structure, it is necessary to set both upper and lower units to an opened state without exception at the time of looking at a display or carrying out a certain operation. It is necessary to open and close it frequently, which is troublesome and leaves room for further improving the handling.

Further, according to the conventional portable telephone of a representative foldable structure, display contents are displayed to match a vertically long display surface. Therefore, at the time of reading displayed characters, the number of displayed characters in one lateral row is small, resulting in many returns and therefore it has been difficult to read. Further, at the time of displaying a horizontally oriented image, it has been necessary to convert the image into a smaller image, or see the whole image by a horizontal scroll operation. This has a drawback in that the easiness of handling is lost.

Further, as a result of securing the end linear portion and the connection member, only a limited design can be obtained by leaving the end linear portion in the external shape, resulting in a problem of a small degree of freedom on design.

In addition to the portable telephone, similar problems generally exist in a foldable apparatus, like a PDA (Personal Digital Assistant), for example, having a display unit and a operation section disposed separately in two units that are connected to be freely opened and closed in a similar manner.

Prior proposals that are individually related to the above problems will be explained briefly. A "foldable portable electronic apparatus" is disclosed in Japanese Patent Application Laid-open Publication No. 11-30226, which tries to solve the above-described problem of the portable telephone of a foldable structure that it is necessary to open the upper and lower units in order to look at the display or carry out an operation, and it is not easy to handle the apparatus.

FIGS. 2A–2C show a foldable portable telephone described in the above publication No. 11-30226. FIG. 2A is a perspective view in an opened state, FIG. 2B is a perspective view that shows a usual folded state, and FIG. 2C is a perspective view that shows a reversed folded state. In each view of FIGS. 2A–2C, reference numerals and symbols corresponding to those used in this publication are attached with a prime symbol "'".

In FIGS. 2A–2C, in the foldable portable electronic apparatus, a pivot 6' that makes it possible to reverse the front and back of a casing 2' at the display section is provided at a right angle to an axis portion 5a' of a hinge 5' that connects the casing 2' at the display section side with a casing 4' at the operation section side. With this arrangement, it is possible to fold the casing 2' at the display section side by reversing it to expose the display unit 1'. This publication also discloses a structure that the pivot 6' is provided with a rotation limiting mechanism that limits the rotation at a front and back reversing position, and a click stopping mechanism that holds a rotation limited state.

In addition to the above, Japanese Patent Application Laid-open Publication No. 11-215218 also discloses a "portable radio communication apparatus" that tries to solve a similar problem.

FIGS. 3A–3C show a portable radio communication apparatus described in the above publication No. 11-215218. FIG. 3A is a perspective view in a state that a casing at a display side is rotated in an opened state, FIG. 3B is a top plan view that shows a first posture that the apparatus is closed with the display set to the inside, and FIG. 3C is a top plan view that shows a second posture that the apparatus is closed with the display exposed to the outside. In each view of FIGS. 3A–3C, reference numerals and symbols corresponding to those used in this publication are attached with a prime symbol "'".

In this publication, a hinge section 5' structured with a ball joint, for example, is used to connect a second casing (a casing at a display section) 6' provided with a display 7' to a first casing 1' that forms a pair with the second casing so that they can be freely opened and closed and supported to rotate relatively in an opened state. With this arrangement, a portable radio communication apparatus 10' is allowed to be closed with the second casing 6' reversed.

In addition to the above, Japanese Patent Application Laid-open Publication No. 2000-353030 proposes an "open/close type portable information terminal" such as a portable telephone that makes it possible to look at a display or carry out a simple operation without setting the upper and lower units to an opened state. According to this open/close type portable information terminal, a display section casing having a display section and a operation section casing having a operation section are structured to be able to rotate freely by connecting respective one end of both casings with a rotation mechanism in a state that a display section surface faces the same direction as that of a operation section surface. Operation keys that make it possible to look at the display section in a closed state, and carry out an operation in a closed state are provided in the display section casing. With this arrangement, it is possible to carry out a simple operation in a closed state.

A technique for solving the other problem that it is difficult to read sentences is disclosed in Japanese Patent Application Laid-open Publication No. 2001-156893. This technique is designed as a communication display system to be provided with a display unit section that can rotate a liquid display unit from vertically oriented to horizontally oriented and vice versa, and a display switching section that changes over a display of the liquid display section from vertically oriented to horizontally oriented and vice versa in synchronization with the rotation of the display unit section.

According to this arrangement, a rotatable display unit section is fitted to a main body in the case of a bar-type portable telephone, and is fitted to an upper unit of a main body in the case of a foldable portable telephone. In both cases, the rotatable display unit section is axially supported rotatably in a plane parallel with a main body surface. In order to improve its operability, this publication also proposes a structure that a operation button is provided on a main body of the communication apparatus that appears after the display unit section has been rotated from vertical orientation to horizontal orientation.

Further, Japanese Patent Application Laid-open Publication No. 7-202748 discloses a portable radio apparatus having a display section that does not rotate but having a casing simply divided into two flat casings which overlap each other and connected rotatably along a plane parallel to the flat surface thereof, allowing the casings to be folded when not used, resulting in improved portability.

Furthermore, Japanese Patent Application Laid-open Publication No. 5-211547 discloses a portable telephone also having a fixed display section, in which a casing having a transmitter is rotatably and axially supported relative to a main casing, and a connection surface of both casings is formed in a curve. With this arrangement, when opened, a receiver and the transmitter are in a distance and at an angle suitable for communications.

SUMMARY OF THE INVENTION

The present invention has been made to solve the above problems in the conventional portable telephone.

An object of the present invention is to provide a foldable portable information terminal that is a further improvement of the conventional foldable structure, to avoid the need of opening upper and lower units to see various displays and carry out corresponding operations, to display a large quantity of characters easy to read, and to improve display of various images, in a novel structure with improved operability compared to the conventional one.

According to the present invention, a foldable portable information terminal includes a first unit having a display section on its one side, a second unit having an operation section, and a movable connecting mechanism connecting the first unit and the second unit at one end thereof. The foldable portable information terminal is characterized in that the movable connecting mechanism allows the first unit to be opened, closed, and freely rotated with respect to a longitudinal direction of the second unit.

The movable connecting mechanism may be a biaxial hinge, which connects the first unit to the second unit so that the first unit is allowed to be opened and closed and rotated freely. The biaxial hinge include: a first rotation axis which is securely and rotatably provided on an operation surface of the second unit in vicinity of one end thereof, the first rotation axis protruding approximately vertically from the operation surface; and a second rotation axis which is orthogonal to the first rotation axis and is provided in vicinity of a front end of the first rotation axis to axially and rotatably support the first unit.

The movable connecting mechanism may be fixedly disposed at a position that is deviated from center of one end of the operation surface of the second unit. In this structure, a part of the operation section on the second unit is exposed in a state that the first unit and the second unit are closed with the display section facing out, wherein a predetermined function is allocated to each key included in the part of the operation section.

The foldable portable information terminal may further include: a first stopping mechanism for stopping the first unit and the second unit at a predetermined rotation position; and a second stopping mechanism for stopping the first unit and the second unit in a predetermined open and close state. In this structure, the foldable portable information terminal may further include: a rotation energizing mechanism for energizing the first unit and the second unit from the vicinity of the predetermined rotation position to a stop state position; and an open and close energizing mechanism for energizing the first unit and the second unit from the vicinity of the predetermined open and close state position to a stop state position.

The foldable portable information terminal may further include: a first restricting means for restricting a range of rotation of the first unit with respect to the second unit within a predetermined rotation angle range; and a second restricting means for restricting the first unit and the second unit within a predetermined open and close angle range. In this structure, a rotation range of the first unit may be restricted within a rotation angle range from −180° to +180°.

The first unit may further have a secondary display section on the other side thereof.

The foldable portable information terminal may further include a position detector for determining an open and closed state and a rotation positional relationship of the first unit and the second unit.

The position detector may include: a plurality of magnetic field generators which are each provided at predetermined positions within one of the first and second units; a plurality of magnetic field detectors which are each provided at predetermined positions within the other of the first and second units, corresponding to the magnetic field generators; and a position determining section for determining a position of the first unit based on a detection signal of the magnetic field detector, wherein the detection signal varies depending on a positional relationship between the first unit and the second unit.

The foldable portable information terminal may further include a display controller controlling the display section of an approximately rectangular shape such that a displaying mode of the display section is changed depending on a positional relationship between the first unit and the second unit.

The display controller may change a direction of displayed contents on the display section so that the direction of the displayed contents matches a longitudinal direction of the second unit independently of a longitudinal direction of the display section which is one of a parallel direction and an orthogonal direction with respect to the longitudinal direction of the second unit.

The display controller may change a direction of displayed contents on the display section so that the direction of the displayed contents matches a position of the second unit in a state that the first unit and the second unit are closed with the display section facing out.

The first unit may have a second operation section which faces out when the first unit and the second unit are closed with the display section facing out so that the second operation section be used to perform a menu operation, an image operation, and a call arrival operation while visually confirming displayed contents on the display section.

The second operation section may be a touch panel provided on the display surface of the display section. The foldable portable information terminal may further include a touch panel function controller for changing a touch panel function enabled area of the touch panel on the display surface depending on a positional relationship between the first unit and the second unit.

The second operation section may include at least one operation button provided on a side surface of the first unit.

In the foldable portable information terminal, a directional operation performed by using the operation section may be changed depending on a positional relationship between the first unit and the second unit. A direction instructed by a direction indication key of the operation section may be changed depending on a positional relationship between the first unit and the second unit, which is one of an open state, a rotated state, and a closed state with the display section facing out.

The display section may be stopped displaying and/or backlighting in a state that the first unit and the second unit are closed with the display section facing in.

The foldable portable information terminal may further include: an alert device for generating an alert for at least a call arrival by using at least one of sound, vibration, light, and the display section; and an alert controller controlling the alert device such that, when the position detector detects that the first unit and the second unit are shifted to a normal conversation position in a state that the alert device is alerting for the call arrival, the alert controller stops the alert device alerting.

The foldable portable information terminal may further include a call arrival and termination controller controlling such that the foldable portable information terminal is made off-hook when the position detector detects that the first unit and the second unit are shifted to a normal conversation position at an occurrence of an incoming call, and on-hook when the position detector detects that the first unit and the second unit are shifted from the normal conversation position to another position after the call has been terminated.

As described above, the foldable portable information terminal can be folded and freely rotated with respect to a longitudinal direction of the second unit, so that it can be folded with the display section facing out. Therefore, without opening the terminal, the user can read a mail, look at a map or other image, or confirm a calling party on the display. Consequently, the user can immediately carry out the operation of receiving a call after judging the display contents in the closed state. When the terminal is folded with the display section facing out, it is possible to carry it in compact while looking at a map or the like on the screen, resulting in improved ease of use.

Since the first unit having the display section can be rotated in a display plane direction, it is possible to suitably display the contents of both vertically and horizontally orientations without increasing in size, that is, the same size as a conventional portable telephone.

A structure in which the connecting member occupies only at the center or in the vicinity of the center on the end section of the terminal increases the degree of freedom in designing, allowing the design of an unprecedented shape.

BRIEF DESCRIPTION OF THE DRAWINGS

FIGS. 12A–12D are plan views each showing main stop positions (relative postures) between the lower unit and the upper unit in a portable telephone according to a second embodiment;

DESCRIPTION OF THE PREFERRED EMBODIMENTS

According to the present invention, in a portable information terminal such as a portable telephone having an upper unit and a lower unit such that a unit having a display section (hereinafter, an upper unit) and a unit having a operation section (hereinafter, a lower unit) are connected to be able to be freely opened and closed, a movable connecting member (such as a biaxial hinge) that connects the upper unit and the lower unit to be able to be freely opened and closed and rotatable with each other is used as a movable connecting member (a hinge section) that connects both units to each other. With this arrangement, a structure is provided that the upper unit rotates freely in the plane surface direction and the longitudinal axis direction thereof around the hinge section.

Such a structure allows the terminal to be closed with the display section facing outside that is normally accommodated inside in the closed state, and the display section to be operated in a position of horizontal orientation, that would be vertically oriented in the opened state. As a result, the handling of the portable information terminal improves substantially as described in detail later. The movable connecting member may be provided at the center position of the end portion of the upper unit and the lower unit, or may be provided at a position deviated from the center position.

The present invention will be described in detail below based on preferred embodiments with reference to the drawings.

First Embodiment

Figure 1:
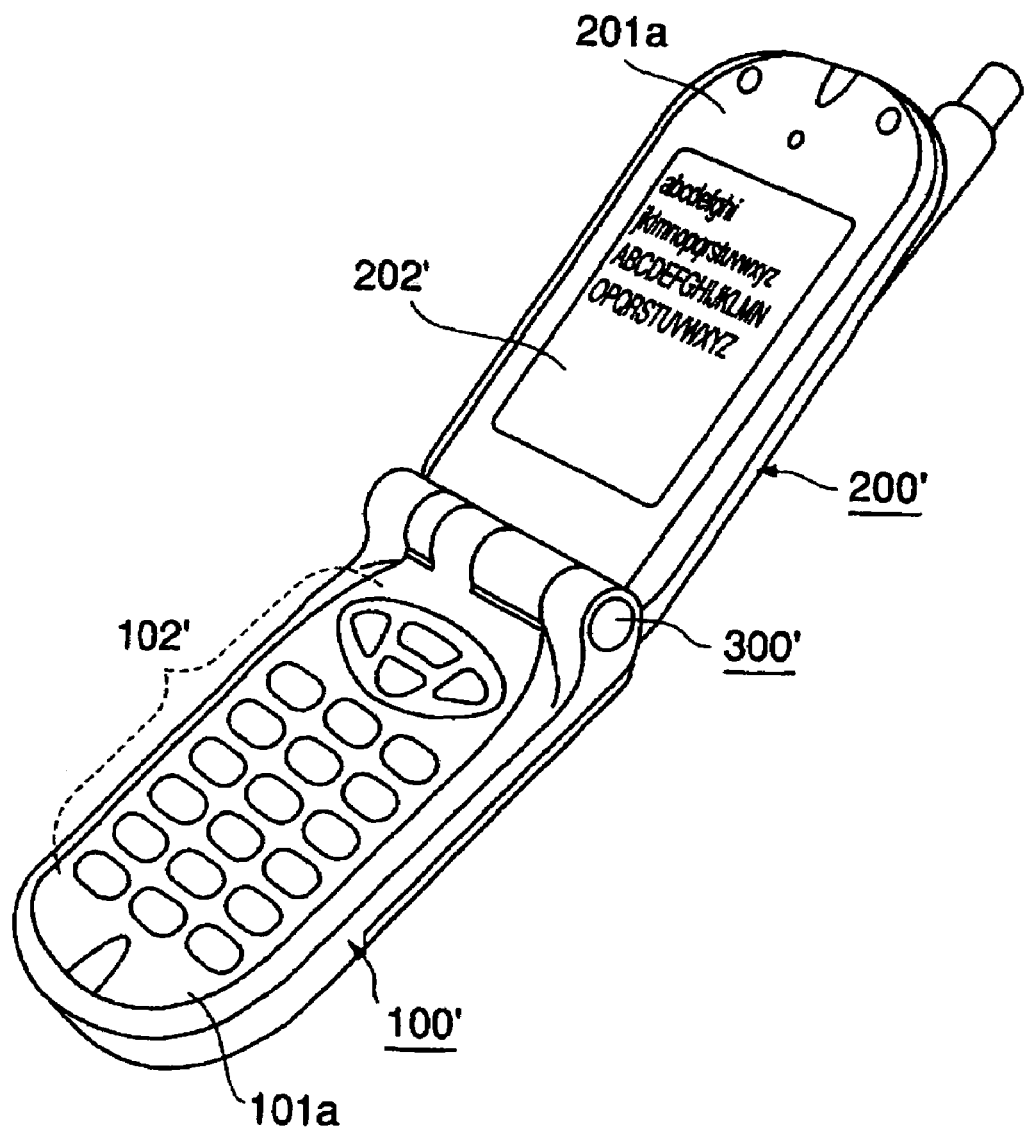
FIG. 1 is a perspective view showing a typical example of a conventional portable telephone having a foldable structure.
Figure 2A:
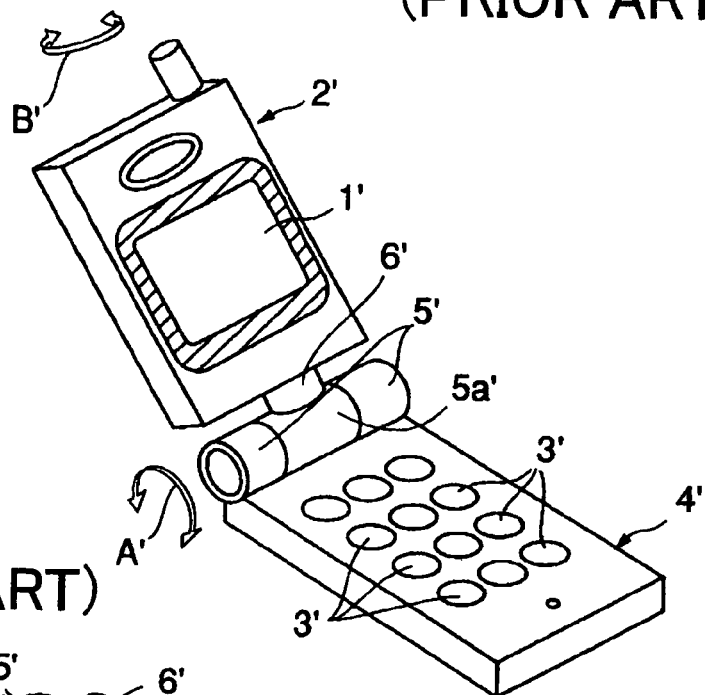
FIG. 2A is a perspective view of another conventional portable telephone in an opened state.
Figure 2B:
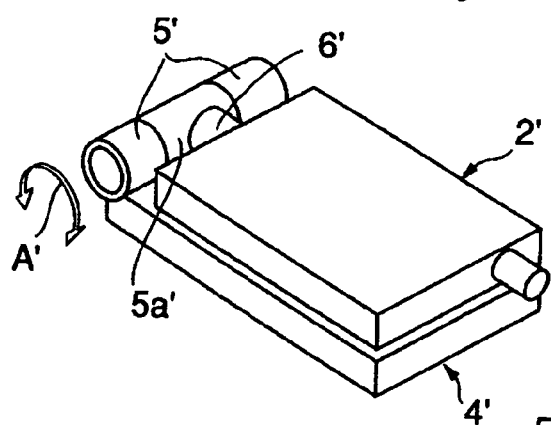
FIG. 2B is a perspective view of the conventional portable telephone in a usual folded state.
Figure 2C:
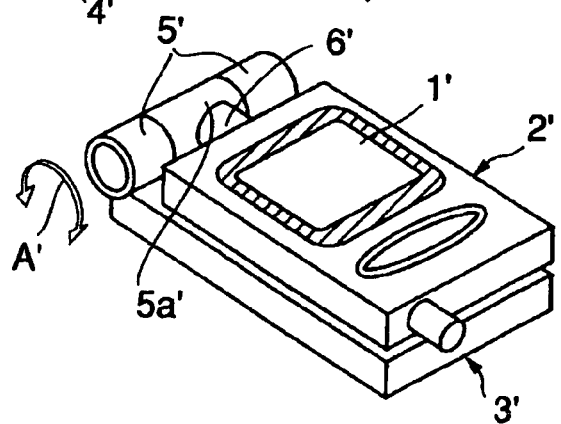
FIG. 2C is a perspective view of the conventional portable telephone in a reverse folded state.
Figure 3A:
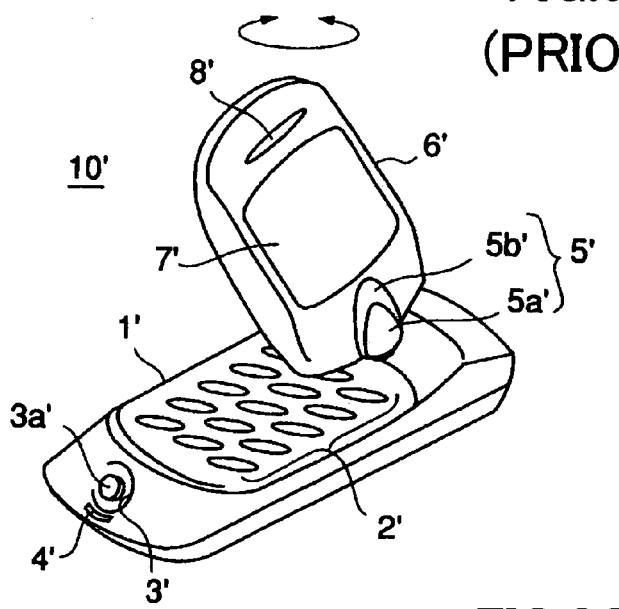
FIG. 3A is a perspective view of another conventional portable telephone in an opened state.
Figure 3B:
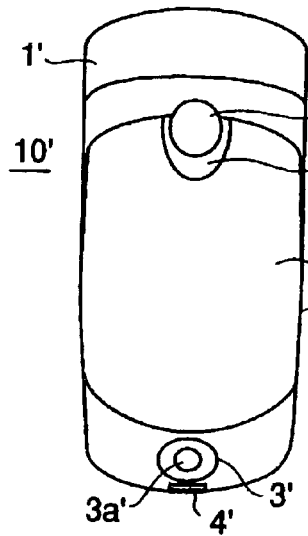
FIG. 3B is a top plan view of the conventional portable telephone in a closed posture.
Figure 3C:
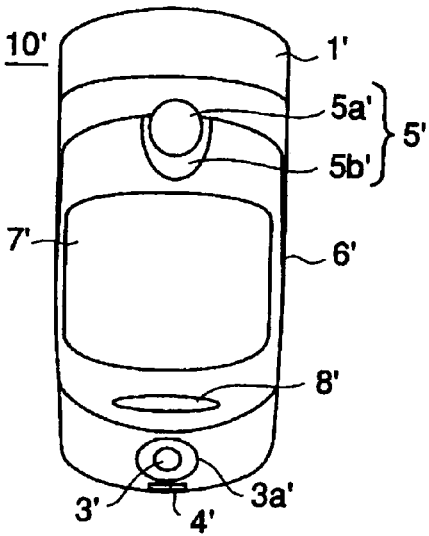
FIG. 3C is a top plan view of the conventional portable telephone in an inversely closed posture.
Figure 4A:
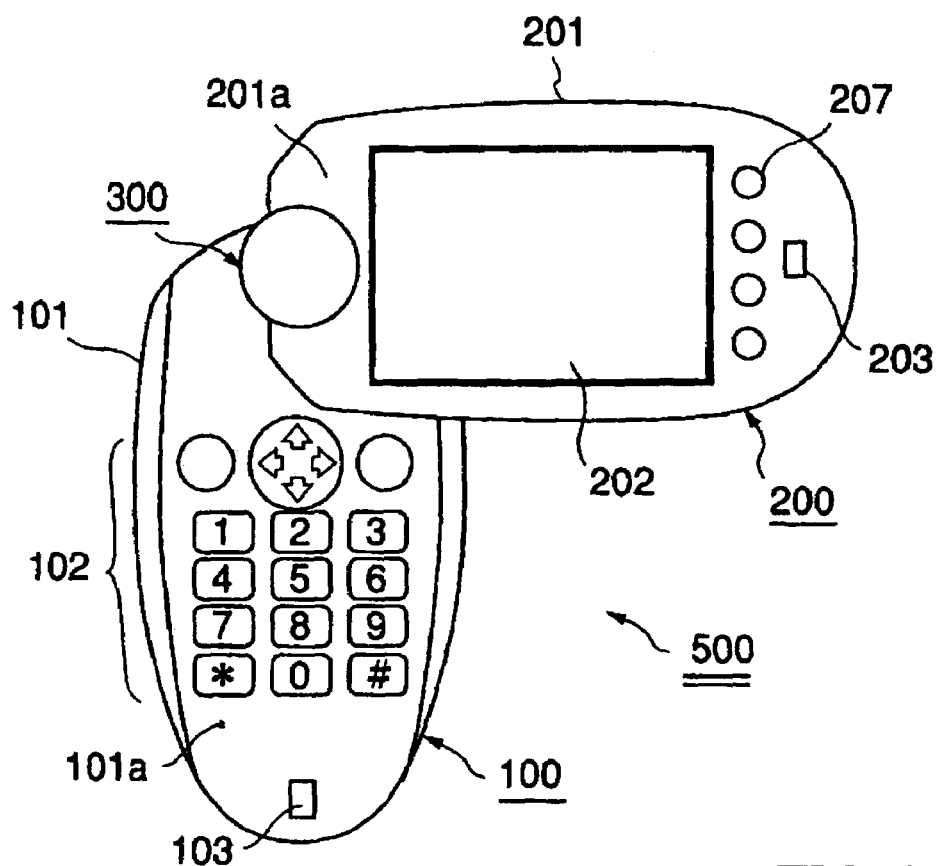
FIG. 4A is a plan view of a portable telephone according to an embodiment of the present invention in a state that an upper unit is extended to a horizontal direction by facing the display surface outward.
Figure 4B:
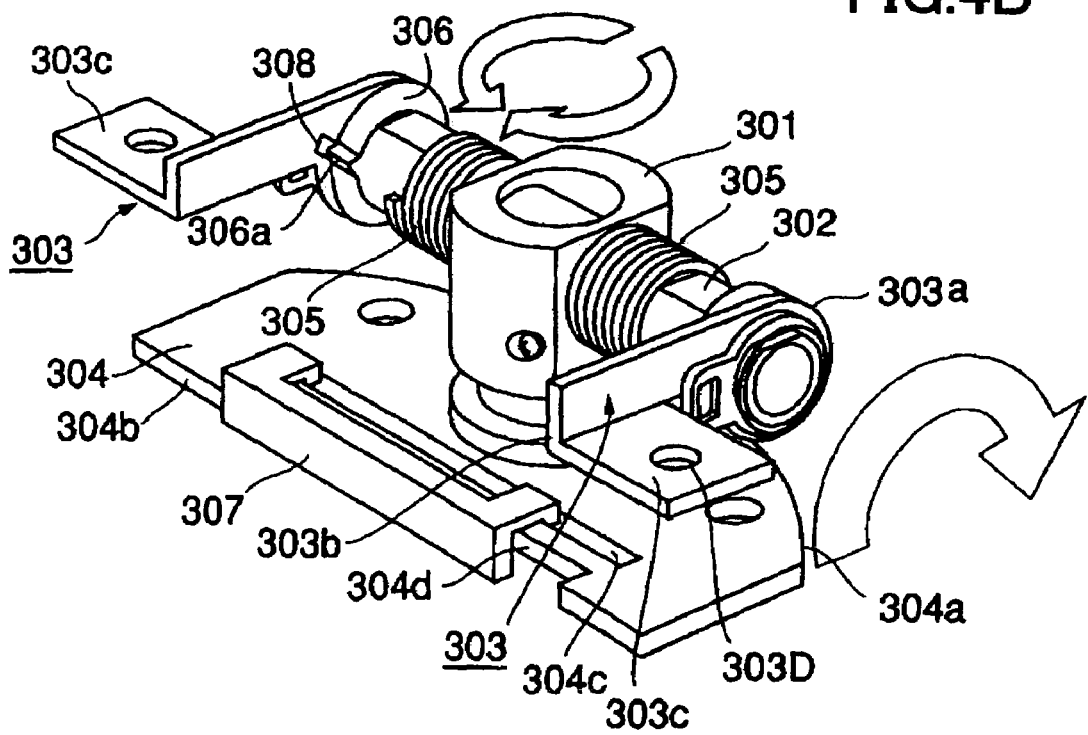
FIG. 4B is a perspective view of the main structure of a biaxial hinge and its vicinity used in the embodiment.
Figure 5A:
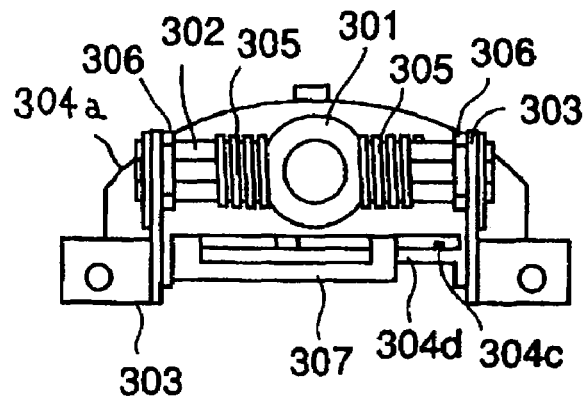
FIG. 5A is a top plan view of the biaxial hinge as shown in FIG. 4B.
Figure 5B:
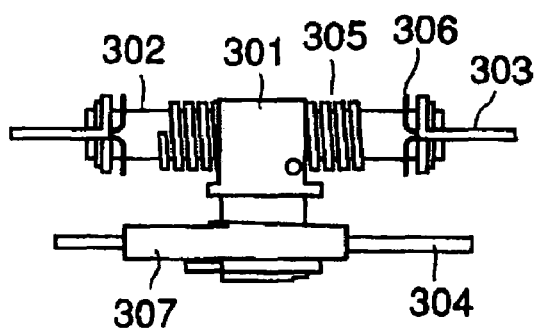
FIG. 5B is a front view of the biaxial hinge as shown in FIG. 4B.
Figure 5C:
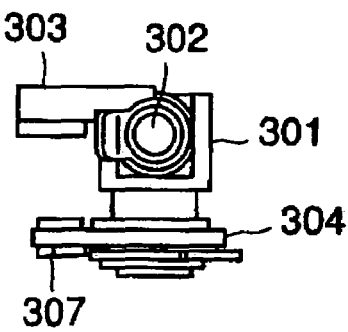
FIG. 5C is a side view of the biaxial hinge as shown in FIG. 4B.
Figure 5D:
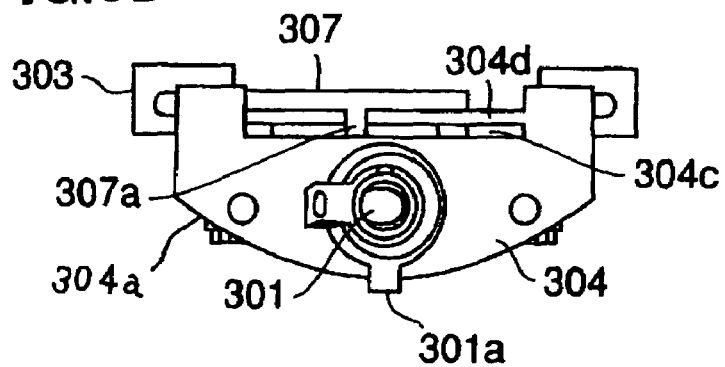
FIG. 5D is a bottom plan view of the biaxial hinge as shown in FIG. 4B.

FIG. 4A shows a state that the upper unit is extended to a horizontal orientation by facing the display surface outward. FIG. 4B shows a structure of the vicinity of a biaxial hinge (movable connecting member) 300 used in the present embodiment.

1.1) Foldable Structure

As shown in FIG. 4A, a portable telephone 500 according to the first embodiment is composed mainly of three portions: a lower unit 100 that has a operation section; an upper unit 200 that has a display section; and the biaxial hinge 300 as a movable connecting member (a universal hinge section) that connects the lower unit 100 and the upper unit 200 allowing free rotation.

The lower unit 100 and the upper unit 200 have flat and oval shapes having predetermined thickness and the approximately same size. The lower unit 100 and the upper unit 200 are mechanically connected via the biaxial hinge 300, which will be described in detail later. The upper unit 200 can rotate freely relative to the lower unit 100 around the biaxial hinge. The lower unit 100 and the upper unit 200 are electrically connected by an appropriate connection means via the biaxial hinge section.

Figure 6:
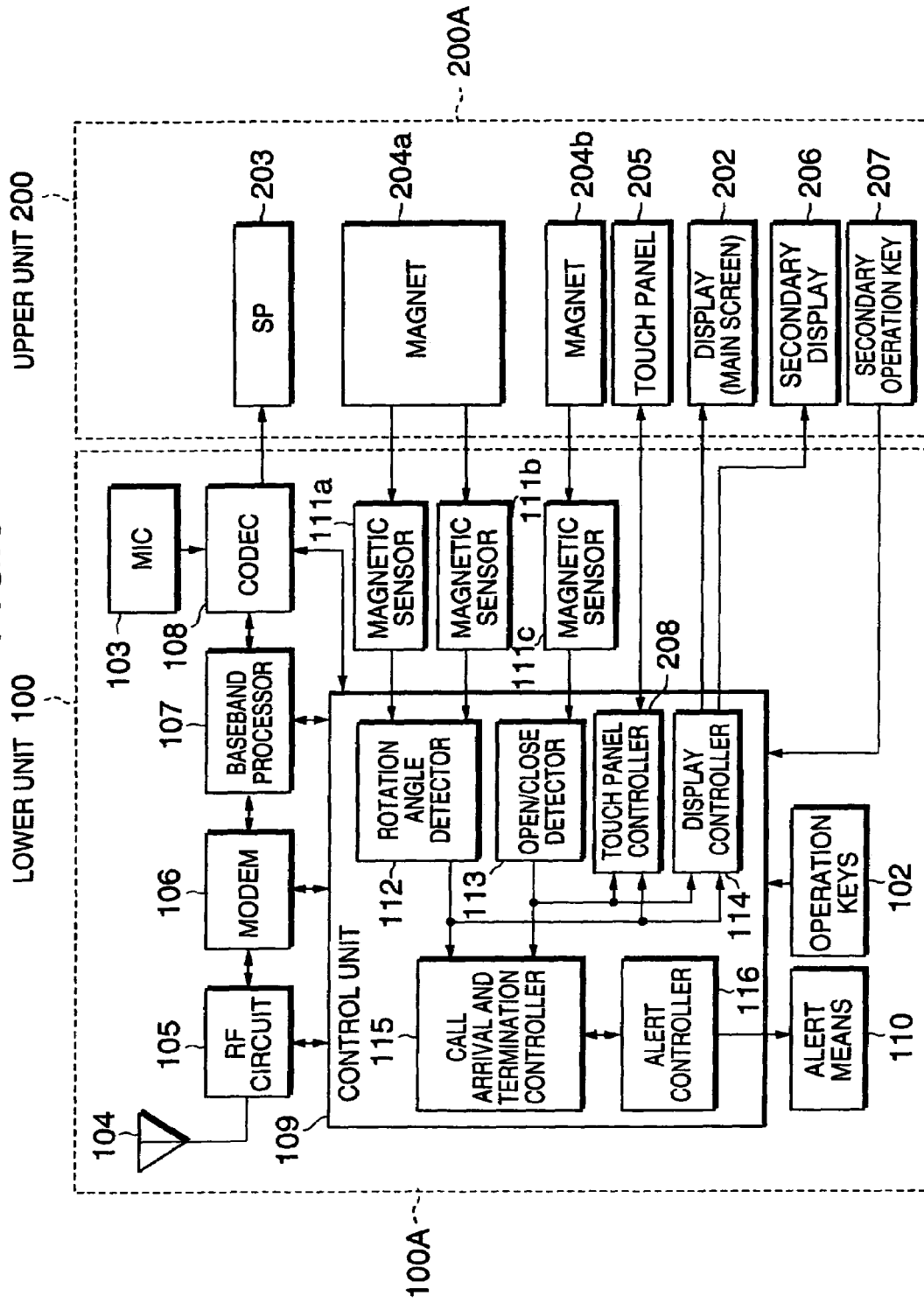
FIG. 6 is a schematic block diagram showing an electric circuit of the portable telephone according to the embodiment.

An external case 101 of the lower unit 100 accommodates various electronic circuits encircled with a broken line 100A of FIG. 6. Each of the circuits will be described later. An operation section is disposed on one surface (the operation surface) 101a of the lower unit 100 and is composed of a plurality of operation keys 102 to be used to perform functions of the portable telephone 500. Further, an opening section for a microphone 103 is disposed at the front end of the same operation surface.

As shown in FIG. 4B, a first rotation axis 301 to be described later is rotatably fixed in a direction approximately perpendicular to the operation surface at the end portion of the lower unit and the center position in a width direction thereof with a predetermined distance (a distance of approximately a half of the thickness of the upper unit) from the edge of the lower unit in the vicinity of the base of the operation surface.

An external case 201 of the upper unit 200 accommodates various electronic circuits encircled with a broken line 200A in FIG. 6. Each of the circuits will be described later. A display unit 202 having approximately a rectangular shape is disposed in vertical orientation on one surface (a display surface) of the upper unit. A speaker 203 is disposed at the front end. A small secondary display unit 206 is provided on the surface opposite to the display surface 201a (not shown in this figure).

A second rotation axis 302 is rotatably fitted to a position at approximately the center in a thickness direction of the upper unit on the base (the connection side) of the upper unit. This second rotation axis 302 has its center rotatably connected to the end of the first rotation axis 301, and has brackets 303 and 303 fitted to both ends of the axis that extends to both sides. The brackets 303 and 303 are securely fixed to the upper unit 200 from the inside.

As explained above, the portable telephone 500 according to the embodiment has such a structure that the two upper and lower units 200 and 100 are connected together with the biaxial hinge 300 that is structured to include the two orthogonal rotation axes 301 and 302 that can rotate independently, at the respective bases of the units.

1.2) Biaxial Hinge

Next, a detailed structure of the biaxial hinge 300 employed in the present embodiment will be further described with reference to each of FIG. 4B and FIGS. 5A–5D. This biaxial hinge 300 is structured to include a first rotation axis (hereinafter, a horizontal rotation axis) 301 made of metal that is accommodated within the lower unit 100, rotatably fixed to a base plate 304 made of metal, which is in turn fixed to the lower unit 100 from the inside, with its end protruding perpendicularly from the lower unit operation surface, and a second rotation axis (hereinafter, an open/close rotation axis) 302 made of metal that is horizontal (parallel with the lower unit), and pierces through the end portion of the horizontal rotation axis 301 at a right angle relative to the horizontal rotation axis 301, and is fixed rotatably.

The open/close rotation axis 302 has a coiled click plate spring 305 and a ring-shaped click plate 306 made of metal loosely and windingly engaged with each of axis portions extended to both sides thereof. A bracket 303 of an L-shaped metal plate is fixed to the front end of the extended axis portion at one end 303a thereof. The other end 303b of each bracket 303 is a fitting wing 303c that has its L-shaped leg bent at a right angle, which appears to extend horizontally in the drawing. The end of the horizontal rotation axis 301, the open/close rotation axis 302, and the brackets 303, 303 are accommodated in the upper unit 200. Fitting holes 303d provided on the fitting wing 303c are used to fix the brackets 303, 303 to the upper unit 200 from the inside.

The horizontal rotation axis 301 and the open/close rotation axis 302 can rotate independently within a limited range. In the present embodiment, a restricting means (a stopper) is provided in each rotation axis mechanism so that a horizontal direction rotation range of the horizontal rotation axis 301 is restricted between −180° and +180°, and a rotation range of the open/close rotation axis 302 is restricted between 0° and 180°. A horizontal rotation axis restricting means (a stopper) restricts a horizontal rotation. The open and close rotation is restricted by butting a click mechanism against the external cases.

The horizontal rotation axis restricting means will be described. The base plate 304 is in approximately a rectangular shape, and one long side 304a is matched with a curve shape of a connection side end of the external case of the lower unit. A long guide hole 304c of a predetermined width and a predetermined length is formed at the center of the other long side with a constant distance from the other long side 304b of the base plate 304. The center portion of the long side 304b corresponding to the long guide hole 304c is cut away by a constant width. Such a structure forms a guide bar 304d having a rectangular shape at its cross section in the long side 304b. A horizontal rotation angle restricting stopper piece 307 is wound around this guide bar 304d so as to be slidable within a predetermined distance. A stopping claw 307a (see FIG. 5D) is formed at the center of the lower side of the horizontal rotation angle restricting stopper piece 307 protruding towards the horizontal rotation axis 301 side.

On the other hand, a projection 301a that is engaged with the stopping claw 307a is fitted to a lower end of the horizontal rotation axis 301, and this rotates together with the horizontal rotation axis 301. When this projection 301a butts against the stopping claw 307a of the horizontal rotation angle restricting stopper piece 307 by the rotation of the rotation axis, a horizontal direction rotation range (a rotation angle) of the upper unit is restricted. In the present embodiment, the rotation angle is restricted to ±180° (rotates by 180° in the clockwise direction and in the counterclockwise direction from a completely folded state). Therefore, it is structured such that the horizontal rotation angle restricting stopper piece 307 slides by the width of the projection 301a of the horizontal rotation axis stopper. Such an arrangement avoids the upper unit 200 excessively rotating by exceeding a folding position. It is preferable that a stopping mechanism is provided that holds the rotation angles with weak force corresponding to the normal communication position, the folding position, and intermediate positions between both positions (rotation angles +90° and −90°).

The click mechanism will be described hereinafter. The click mechanism is a mechanism that generates a suction torque to an opened state and a closed state (a torque to suck to an open position and a close position near the open position and the close position), and generates a holding torque at these positions. The click mechanism of the present embodiment is structured by the click plate 306 having a click plate projection 306a, a bracket groove 308, and the click plate spring 305.

The click plate 306 has the click plate projection 306a extending to the bracket side (outwardly). Each of the brackets 303, 303 has the bracket groove 308 formed on its inside surface so as to be engaged with the click plate projection 306a when the bracket is at a predetermined rotation position. The bracket groove 308 is provided at positions (angles, for example, 160° and 180°) at which a click is generated at the close position and open position.

The click plate spring 305 presses the click plate 306 against the bracket 303. This pressing force defines the click torque. In the drawing, it appears that the click plate spring 305 is separated from the click plate 306 because the drawing is partly omitted. However, actually; the spring 305 is mounted in a compressed state between the click plate 306 and the horizontal rotation axis 301 to energize the click plate 306 outwardly at all times. A click is generated when the click plate projection 306a drops into the bracket groove 308 at predetermined open and close positions. When the click plate projection 306a is not at a click generation position, an open and closed state (an extension angle) is held with weak force, based on frictional force between the click plate 306 and the bracket 303.

The upper unit and the lower unit can be electrically connected using a known method. For example, both units may be electrically connected by hollowing both the horizontal rotation axis and the open/close rotation axis and passing interconnection wires through the hollows. Alternatively, an FPC (flexible print circuit) may be used to connect both ends to the lower unit and the upper unit in such a way that a film-shaped FPC is wound around both rotation axes. In this case, it is preferable that the FPC is wound around each rotation axis by at least one turn, in order to increase durability of the FPC.

In the above-described biaxial hinge, the open/close rotation axis is rotatable relative to the horizontal rotation axis. Alternatively, it is also possible to structure such that the open/close rotation axis and the horizontal rotation axis are firmly fixed, and a bracket is rotatably fixed to each of both ends of the horizontal axis. Such an arrangement can be used in exactly the same manner as the biaxial hinge, and it is possible to rotate the upper and lower two units 200 and 100 independently in the horizontal direction and the open and close direction. This biaxial hinge structure can provide a second rotation axis acting as the open/close rotation axis composed of the axis portion and the bracket constitute. Such a structure is also included in the concept of the biaxial hinge in the present invention.

1.3) Electric Circuit

Next, an electric circuit of the portable telephone according to the present embodiment will be described.

As shown in FIG. 6, the portable telephone according to the present embodiment is structured to include an antenna 104, an RF circuit 105, a modem 106, a baseband processing circuit 107, a codec circuit 108, a control unit 109, a microphone 103, operation keys 102, a alert means 110, and three magnetic sensors 111a, 111b and 111c that detect a position of the upper unit (a posture relative to the lower unit). These functional sections are mounted within the lower unit 100. A means for detecting a position of the upper unit (a posture relative to the lower unit) is not restricted to the magnetic sensors (Hall elements). It is also possible to use a reed switch or a known mechanical switch, for example.

The control unit 109 includes a rotation angle detector 112 that decides a rotation angle of the upper unit 200 based on the output of each magnetic sensor 111, an open/close detector 113 that detects an open/close state including a front/back state, a display controller 114 that controls a direction of display contents so as to reflect outputs of the rotation angle detector 112 and the open/close detector 113, a call arrival and termination controller 115 that can carry out a call arrival control operation corresponding to the open/close and movement operation of the upper unit, and an alert controller 116 that can control a call arrival notification corresponding to the open/close and movement operation of the upper unit.

The RF circuit 105 has a receiving circuit, a transmitting circuit, and a frequency synthesizer, which are not shown. The operation keys 102 includes a transmission key, conversion keys for alphabet/Kana/Kanji/numeral, a power source on/off key, a cross key for cursor operation, and an end key.

Further, the portable telephone of the embodiment is structured to include a speaker 203, a magnet 204a corresponding to the magnetic sensors 111a and 111b, a magnet 204c corresponding to the magnetic sensor 111c, a display unit (a liquid crystal display: LCD) 202 that becomes a main screen, and a touch panel mechanism 205, a secondary display unit 206, and a secondary operation key 207, which are built in the surface of the display unit 202. These functional sections are mounted on the upper unit. The speaker 203 acts as a telephone receiver and also as an alert means 110.

These individual circuit parts that constitute the electric circuit may be conventional ones, and their detailed descriptions and functions will be omitted.

In the portable telephone 500 according to the present embodiment having the two units connected with the biaxial hinge 300, the upper unit 200 can be opened and closed relative to the lower unit by rotating around the second rotation axis 302, and can rotate around the first rotation axis 301 relative to the lower unit 100. Therefore, although front and back surface direction of the upper unit 200 is limited to a direction parallel with the second rotation axis 302, the upper unit can pivot around the position of the first rotation axis to an arbitrary position on one surface side of the lower unit. Further, it is also possible to turn upside down on the same position. In other words, the lower unit 100 and the upper unit 200 can take various relative postures as demanded. At one of the predetermined stop positions, it is possible to hold a relative posture with the horizontal rotation axis restricting means and the click mechanism.

1.4) Relative Position Detection

The magnetic sensors 111a, 111b and 111c and the magnets 204 cooperate to detect a relative position between the lower unit 100 and the upper unit 200. Installation positions of the magnetic sensors 111 and the magnets 204 will be described in detail.

Figure 7A:
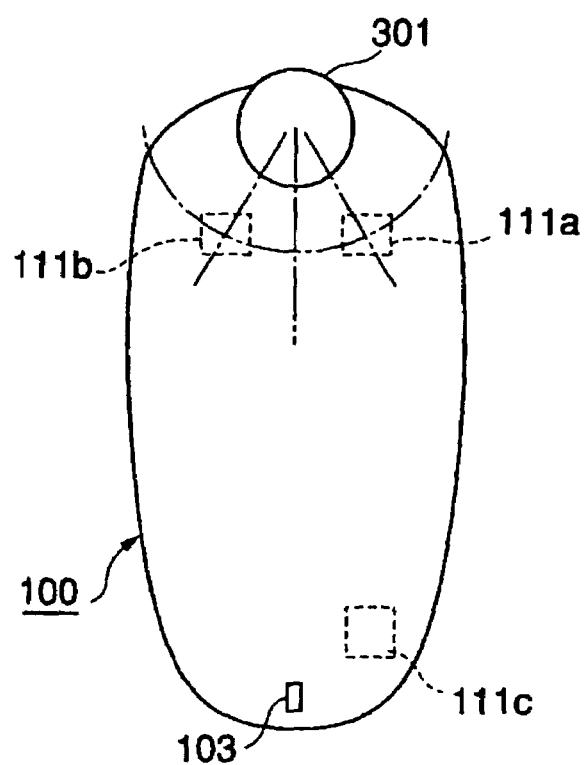
FIGS. 7A and 7B are schematic views for explanation of the layout of magnetic sensors and magnets in the portable telephone according to the embodiment.

As shown in FIG. 7A, three Hall elements (magnetic sensors) 111 are disposed inside the lower unit 100 with the sensitive sides of the sensors facing the operation surface side. The two Hall elements 111a and 111b are disposed on the circumference of a predetermined radius around the horizontal rotation axis 301 and on two radius lines that each form an angle of 45° with respect to a long axis of the lower unit to form a central angle of 90° in the drawing. The third Hall element 111c is disposed at a position shifting to one side in the front end of the lower unit.

Figure 7B:
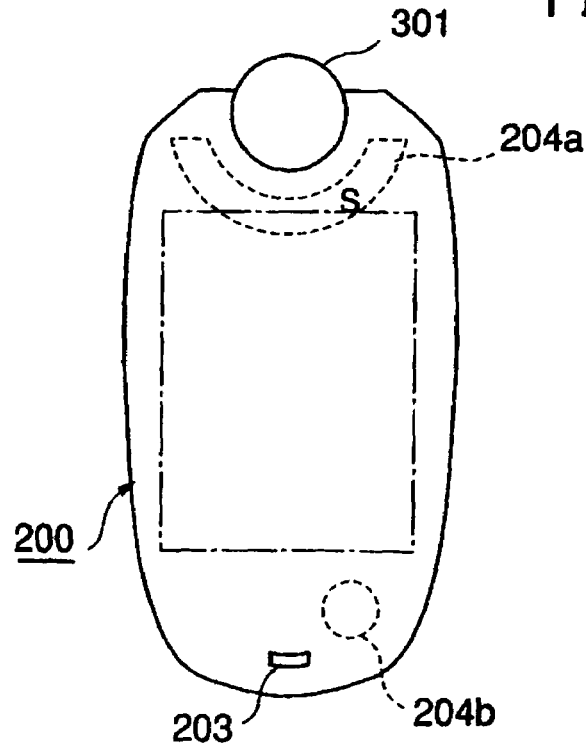

On the other hand, as shown in FIG. 7B, the magnet 204a that has a semicircle shape and is magnetized in a thickness direction in the drawing is fitted along the circumference of the predetermined radius around the first rotation axis 301 inside the upper unit 200. Further, the magnet 204b is provided at a position corresponding to the Hall element 111c in the front end of the upper unit.

The magnetic sensors 111 may be disposed on the upper unit 200, and the magnets 204 may be disposed on the lower unit 100. It is essential that one of the magnetic sensor and the magnet forming a pair is disposed on the upper unit and the other is disposed on the lower unit. It is not always necessary to use a semicircle magnet, and separate magnets may be disposed at corresponding positions of the Hall elements 111a and 111b.

Figure 8:
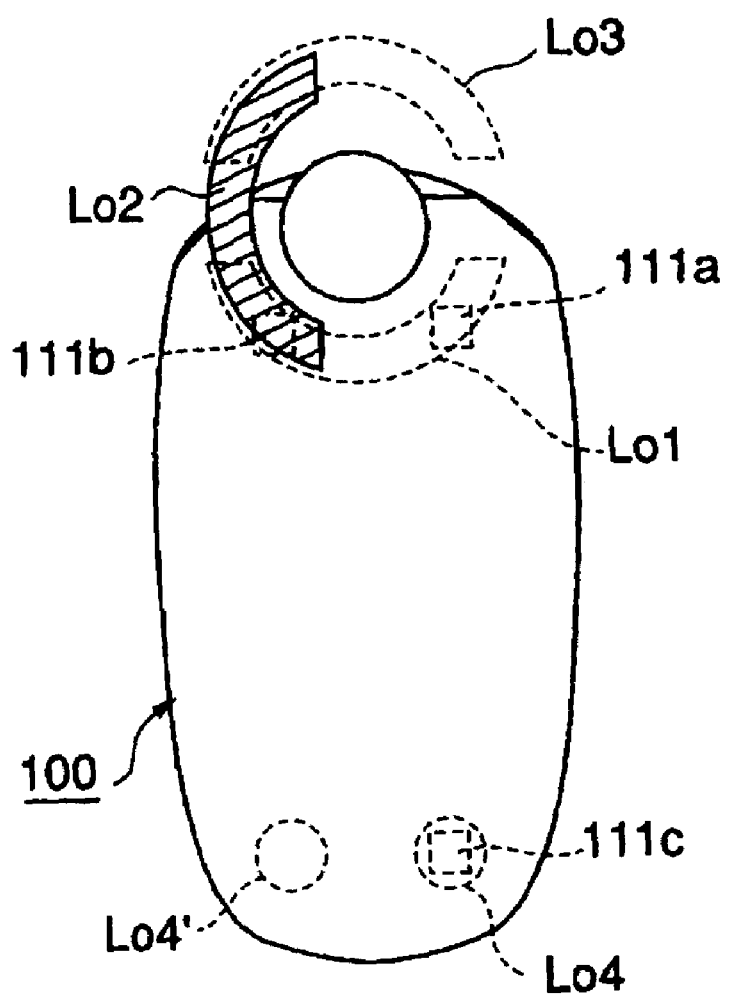
FIG. 8 is an explanatory view showing positions of magnets corresponding to Hall elements of a lower unit in respective ones of main rotation positions of an upper unit.

As shown in FIG. 8, Lo1 indicates a position of the magnet 204a and Lo4 indicates a position of the magnet 204b in the case where both units are folded with the display surface exposed to the outside. In this state, the respective Hall elements 111a, 111b, and 111c generate outputs and therefore a current state (position) of the upper unit can be determined based on the outputs from the rotation angle detector 112 and the open/close detector 113.

Lo2 indicates a position of the magnet 204a when rotated by 90° in a clockwise direction in the drawing. In this case, only the Hall element 111b generates an output and thereby a state (position) of the upper unit can be determined. Lo3 indicates a position of the magnet 204a when further rotated by 90° in the clockwise direction in the drawing (a normal communication position). In this case, no output is obtained from any one the Hall elements. Therefore, it is possible to decide a state (position) of the upper unit.

When both units are folded with the display surface facing inside, the position of the magnet 204a also becomes Lo1 (the direction of the magnetic field becomes opposite in case of FIG. 8). However, since the position of the magnet 204c becomes Lo4' which does not coincide with the Hall element 111c, it is possible to determine that both units are in the folded state with the display surface facing inside. When the Hall element also detects a direction of the magnetic field of the magnet, it is possible to decide various kinds of position without providing the Hall element 111c and the magnet 204b, and it is possible to detect a finer difference in position.

1.5) Positions of Upper and Lower Units

In the portable telephone according to the embodiment, the lower unit and the upper unit can take various mutual positions (relative postures) as demanded. Particularly, at stop positions as shown in FIGS. 9A–9D, it is possible to hold the relative position.

Figure 9A:
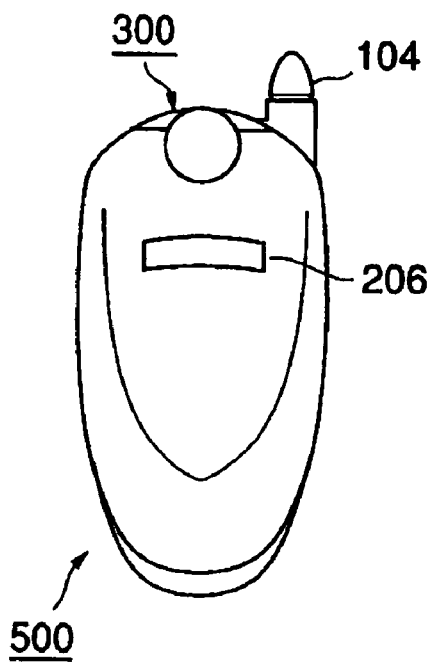
FIGS. 9A–9D are plan views each showing main stop positions (relative postures) of a lower unit and an upper unit in the portable telephone according to the embodiment.

As shown in FIG. 9A, the portable telephone is folded as the conventional case, which is compact and convenient to carry. Further, the display surface is protected without being exposed to outside. The secondary display section 206 provides a minimum display for information.

Figure 9B:
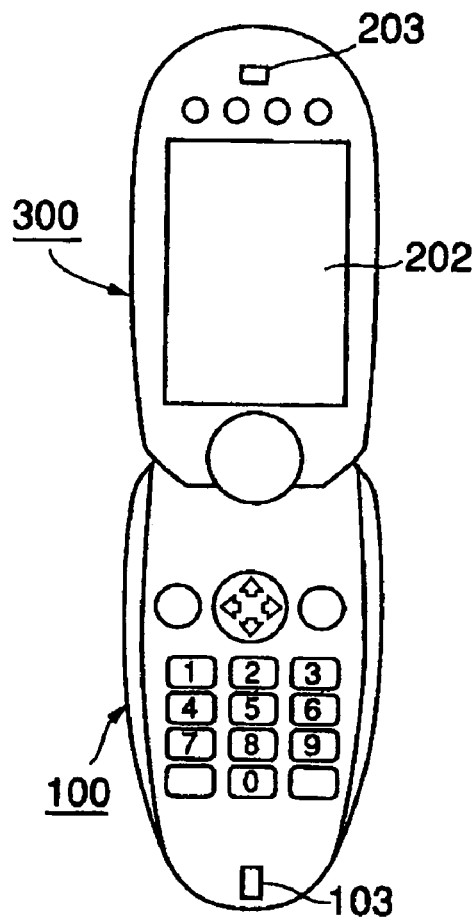

FIG. 9B shows a state (a normal communication state) that the upper unit 200 is erected and extended from the state of FIG. 9A. In this state, confirmation of the display, various kinds of operation, and communications can be performed in a similar manner to that of the conventional portable telephone.

Figure 9C:
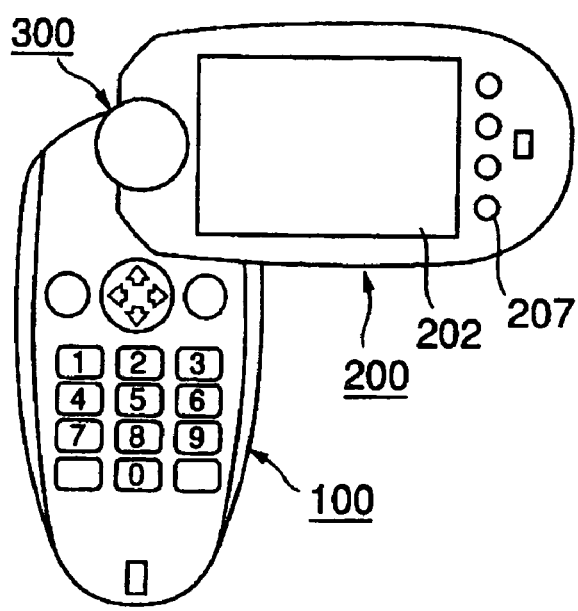

Next, FIG. 9C shows a state that the upper unit 200 is rotated by approximately 90 degrees in the clockwise direction from the state shown in FIG. 9B, for example, along a plane parallel with the operation surface 101a of the lower unit 100. At this time, the display section is horizontally oriented. The state of FIG. 9C is also obtained when the upper unit is rotated in the counterclockwise direction by sliding it from the folded state of FIG. 9D.

When the upper unit and the lower unit are in the positional relationship as shown in FIG. 9C, this positional relationship is detected by the above-described position detecting means, which causes the display controller 114 to convert the display contents to be displayed on the display unit 202 into a horizontally oriented display (the left and right direction of the display contents matches the long side direction of the display unit).

In the state as shown in FIG. 9C, it is easy to confirm a large quantity of character information and to look at the display of an image that is long in the horizontal direction because of a horizontally oriented display.

Figure 10A:
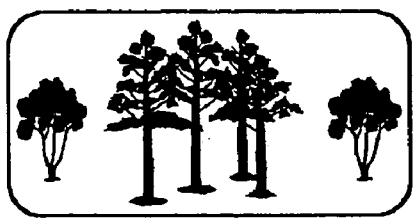
FIGS. 10A and 10B are explanatory views that show display examples (images) of a display unit in the portable telephone according to the embodiment.

FIG. 10A shows a display example (an image) of the display unit 202 in a state that the horizontally oriented contents information is displayed on the horizontally oriented screen. As shown in FIG. 10A, the whole display image of the horizontally long contents is displayed on the horizontally oriented screen.

Figure 9D:
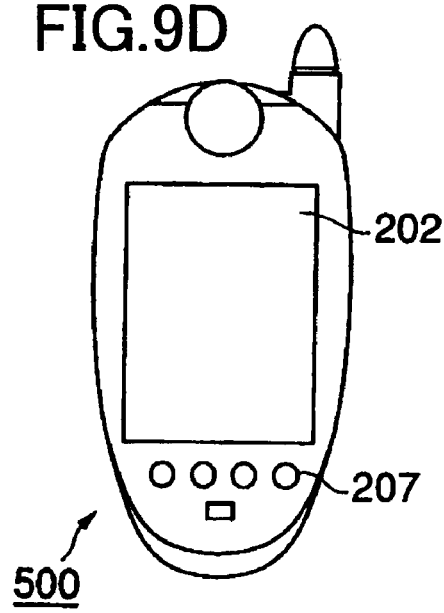

According to the apparatus of the present embodiment, the vertically oriented contents can be displayed as it is in the vertically oriented position of the display section as shown in FIGS. 9B and 9D, and further it is also possible to display the center portion of a horizontally oriented image together with additional information by a predetermined operation or setting.

Figure 10B:
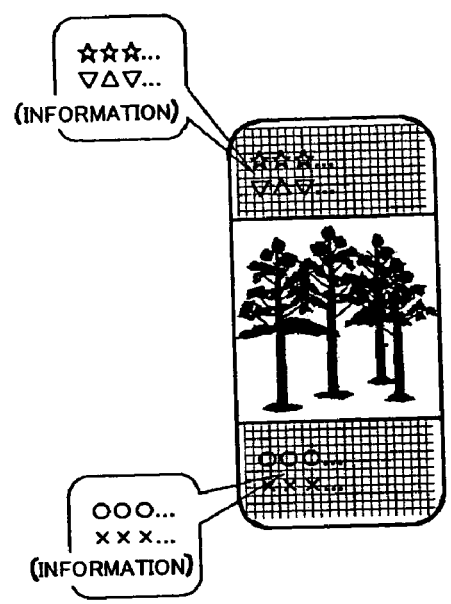

FIG. 10B shows another display example of the display unit 202 that horizontally long contents information is displayed on the vertically oriented display screen as shown in FIGS. 9B and 9D.

In this vertically oriented displaying state, the left and right side portions of the contents are cut as shown in FIG. 10B. When the horizontally long contents information is displayed on the vertically oriented screen, it is possible to display contents supplementary information (subtitle information relating to the contents) or other function (mail function or the like) in the upper and lower margins (a contents non-display portion, or a shaded area of the vertically oriented screen in FIG. 10B). Such a vertically oriented displaying mode allows a function change, for example, by turning off sound output and displaying subtitles, or allows concurrent use of a plurality of functions such that another function is performed while receiving vertically oriented contents information that is streaming.

1.6) Direction Control

In the present embodiment, since both units can take the above-described various positions, the direction-included operation by a key such as a direction instructing key (cursor key) matches the display direction corresponding to each of the above-described various positions.

Figure 11A:
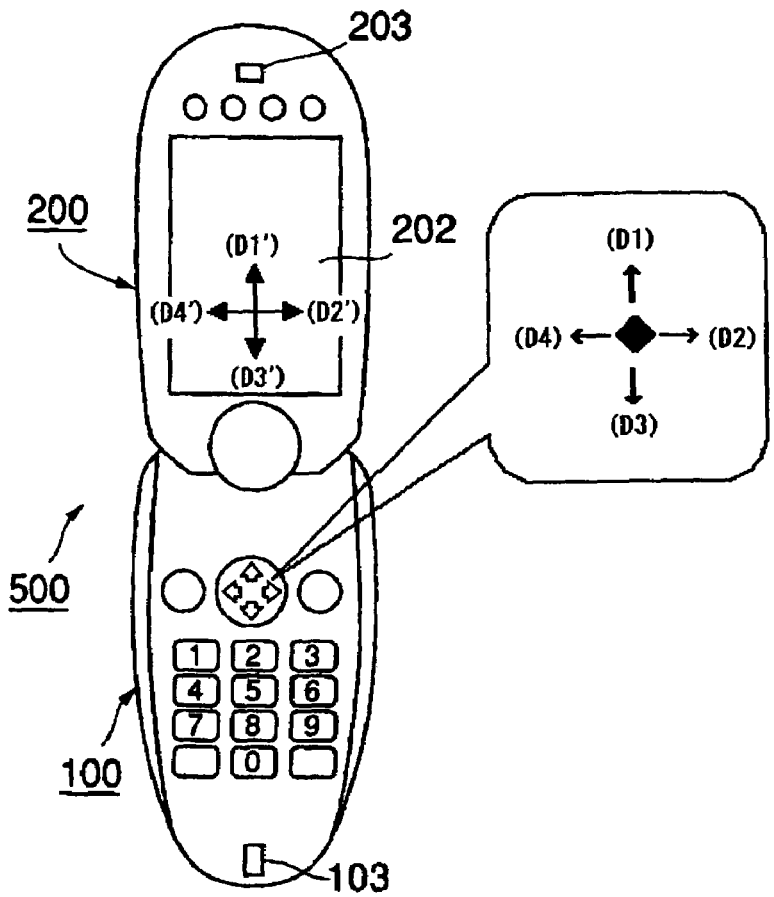
FIGS. 11A and 11B are plan views showing a relationship between a display and directions of operation keys at different stop positions (relative postures) between the lower unit and the upper unit in the portable telephone according to the embodiment.

As shown in FIG. 11A, consider the case where the upper unit 200 is erected and extended from the closed state (normal communication position) and a menu or contents are displayed on the display unit 202 of the upper unit 200. In this case, a "direction key" in the operation keys 102 of the lower unit 100 is used to move a cursor or select a menu item. When the "direction key" corresponding to one of directions D1–D4 is depressed, a processing in a corresponding one of directions D1'–D4' is carried out on the display screen.

Figure 11B:
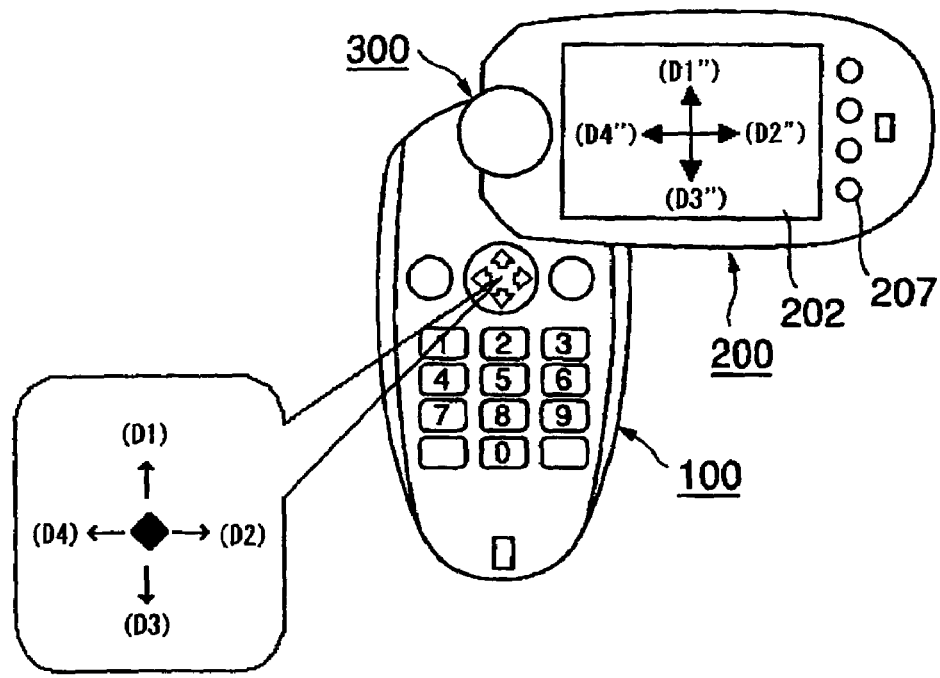

Subsequently, when the display unit 202 is rotated by 90 degrees from the state of FIG. 11A, a move direction by the operation key 102 (the direction key) is changed so as to match the top, bottom, left and right of the display unit 202 of the upper unit 200 as shown in FIG. 11B. In other words, when the "direction key" corresponding to one of the directions D1–D4 is depressed, the processing in a corresponding one of directions D1" to D4" that are different from the above directions (but coincide with operation directions of the "direction key") is carried out on the horizontally oriented display screen. In this manner, the operation instructed by an operation key is suitably changed depending on the changeover between vertical and horizontal orientations of the display unit.

As described above, according to the portable telephone of the embodiment, it is possible to look at the display by rotating the display unit to a desired direction in the opened state, and carry out a desired operation. Although not shown in the drawing, contrary to the above explanation, it is also possible to rotate the upper unit 200 in the counterclockwise direction in a display plane direction by approximately 90 degrees from a normal communication position (a standard extension state) as shown in FIG. 9B. In this state, the upper unit 200 and the lower unit 100 also become in an approximately orthogonal state within approximately the same plane, and the display unit becomes horizontally oriented with respect to the top and bottom directions of the operation surface.

In this case, such a positional relation of the upper unit and the lower unit can be detected by the above-described position detecting means, which causes the display controller 114 to convert the display contents to be displayed on the display unit 202 to a horizontally oriented display, that is, the left and right direction of the display contents matches the long side direction of the display unit, which is an opposite direction to the direction shown in FIG. 9C. Further, the processing instructed by a predetermined operation key is appropriately changed as described before.

In the portable telephone according to the embodiment, it is also possible to set the upper and lower units to a closed state such that the display unit faces out, which is opposite to the usual state that the display unit is accommodated inside when closed. As shown in FIG. 9D, the upper unit 200 is folded to the lower unit 100 with the display surface of the upper unit 200 facing out. For example, when the upper unit 200 is rotated by a half turn from a state that the portable telephone is opened as shown in FIG. 9B, it is possible to close the upper and lower units in an opposite direction with the display surface exposed to the outside as shown in FIG. 9D. In this state, the portable telephone becomes compact and becomes convenient for carrying it. At the same time, it is possible to visually confirm the display contents in the folded state. Further, since the second operation section 207 is exposed to the outside, it is possible to carry out a desired operation in response to the display contents by using the second operation section 207.

Such a folded state as shown in FIG. 9D is detected by the above-described upper unit position detecting means, which causes the display contents on the display unit to turn upside down. In this case, the direction-included operation by a key such as a direction instructing key (cursor key) matches the display direction. With this arrangement, it is possible to read the displayed contents as they are and carry out a desired operation as in the usually folded state without changing the way the user holds the portable telephone in the hand.

1.7) Operation

An operation of the portable telephone according to the embodiment will be described.

First, the operation of the portable telephone for transmitting and receiving a speech signal will be explained. The antenna 104 receives a radio signal from a base station, and transmits a radio signal. A radio signal received by the antenna 104 is output to a receiving circuit of the RF circuit 105. The receiving circuit selects a signal of a frequency indicated by a frequency synthesizer, and determines whether the selected signal includes a signal notifying of an incoming call to its own terminal (standby reception).

When the receiving circuit has detected a signal that notifies a call arrival to the own terminal, the receiving circuit notifies the call arrival to the control unit 109. The control unit 109 receives the notification from the receiving circuit that there is a call arrival to the own terminal, and drives the alert means 110 such as a beeper, a vibrator and/or a light-emitting diode to notify the user by sound, vibration and/or light blinking of the occurrence of an incoming call to the own terminal.

A user can set the portable telephone to a mode such that, when it is detected that the upper unit and the lower unit are opened in a normal communication position, the call arrival and termination controller 115 automatically sets the operation to an off-hook state to connect the telephone line. In this setting, the reception signal transmitted from a call originating terminal is output to the modem (modem) 106 via the RF circuit 105. At the same time, the call arrival and termination controller 115 stops the alert operation.

Then, the modem 106 demodulates the reception signal to produce a baseband reception signal and output it to the baseband processing circuit 107. The baseband processing circuit 107 processes the baseband reception signal and outputs it to the codec circuit 108. The codec circuit 108 decodes the baseband reception signal to output a sound signal to the speaker (telephone receiver) 203, which outputs sound waves. The codec circuit 108 also encodes a sound signal received by the microphone 103 to output a transmission signal to the baseband processing circuit 107 and the transmission signal is transmitted to the destination through the modem 106 and the RF circuit 105. With this arrangement, the user can carry out communications immediately after the upper and lower units are opened.

When the above setting has not been done or when the upper unit and the lower unit have already been opened at the call arrival time, the telephone line is connected upon the off-hook operation of the user with a communication start key to allow communication.

When the user closes the upper unit and the lower unit to shift from the normal communication position to another after termination of the conversation, the unit position detector detects this position change, and the call arrival and termination controller automatically sets the operation state to the on-hook state (communication termination processing). Of course, the same communication termination can be made by the user operating a predetermined termination key for off-hook in the normal communication position.

1.8) Transmission and Reception Operation

Next, the operation of transmitting and receiving character data or graphics data in this portable telephone will be described. The portable telephone monitors whether the selected signal includes a signal indicating transmission of character data to its own terminal (standby reception). When character data or graphics data has been received, the control unit 109 automatically receives the transmitted character data without waiting for the off-hook operation, and displays information in the display unit 202 based on the received data. At the same time, the alert controller 116 drives the alert means 110 such as a beeper or a vibrator in a predetermined fashion different from that at the occurrence of an incoming call to notify the user that character data or graphics data has been received.

In other words, a signal carrying character data received from the call originating terminal is output to the modem 106 via the RF circuit 105, and is demodulated by the modem 106. The demodulated signal enters the baseband processing circuit 107, which extracts character data from the demodulated signal, to output it to the control unit 109.

The control unit 109 includes the a CPU, a ROM storing programs, data necessary to process various kinds of processing, and character font data, a RAM used as a work area, a Video RAM to display information on the display unit 202, and the display controller 114 that controls the display unit 202 and/or the secondary display 206.

The display controller 114 forms character information or graphic information to be displayed on the display unit 202 (or the secondary display unit 206 if necessary) based on data received from the baseband processing circuit 107.

Further, the portable telephone can create message data and transmit it to a destination. In other words, alphabet letters and Katakana characters are allocated to dial operation keys such as 0 to 9, *, and # that are provided on the operation section 102, and these keys include a conversion key for alphabet/Kana/Kanji/numeral conversion. It is possible to input message data and transmit it to a destination designated by the user operating these dial operation keys and the conversion key.

Particularly, in this portable telephone, when character data or graphics data is transmitted or received, the display unit 202 can be rotated to set the display to be horizontally long or horizontally oriented, making it easy to read displayed information, compared with the case of a vertically oriented screen. When character data or graphics data has been received, it is possible to use the display unit 202 as a horizontally oriented display unit as shown in FIG. 9C if the user wishes. At this time, as described before, the display controller 114 displays the display contents on the display unit 202 by converting the contents so as to match the direction of the horizontally oriented screen. The upper unit 202 may be fixed to be reversed left to right, which is opposite to that in FIG. 9C. At this time, the display controller 114 also displays the contents on the display unit 202 by converting the contents to match the direction of the horizontally oriented screen. Further, the processing instructed by a predetermined operation key is appropriately changed as described before.

Further, in this portable telephone, it is possible to transmit and receive character data or graphics data in the state that the upper unit and the lower unit are folded with the display unit 202 facing out. In other words, in the folded state with the display unit 202 facing out, the user can see the display unit 202 as it is. As the secondary operation keys 207 are also exposed to the external surface, when character data or graphics data has been received, it is possible to confirm the display instantly, and it is also possible to carry out a simple response operation in a state that the portable telephone is closed. At this time, when the display controller 114 displays the display contents on the display unit 202 by converting the contents to match the direction of the display screen that is reversed, the user can look at the display and carry out a response operation in the manner that the user is used to holding the terminal in the hand.

At the time of receiving desired image data, it is possible to make a request for the desired image data by setting the upper unit as shown in FIG. 9C. At the time of transmitting character data such as a message, it is possible to input characters in a position as shown in FIG. 9C, allowing easy input of characters in an easy-to-read display.

As described above, the portable telephone according to the present embodiment can provide the following advantages.

First, a conventional foldable portable telephone that is commercially available cannot see the main display without opening it. However, according to the present embodiment, the portable telephone can be folded with the display section facing out. Therefore, without opening the portable telephone, the user can read a mail, look at a map or other image, or confirm a calling party on the display. Consequently, the user can immediately carry out the operation of receiving a telephone call after judging the display contents in the closed state. When the portable telephone is folded with the display section facing out, it is possible to carry it in compact while looking at a map or the like on the screen. When the portable telephone is folded with the display section facing in as in the conventional case, it is possible to carry the portable telephone with protecting the display section. Further, by rotating the display unit to vertical orientation, it is possible to display the contents in a desired one of vertically oriented and horizontally oriented states with one portable telephone having the same size as the conventional one.

Second Embodiment

FIGS. 12A–12D show different positions of a portable information terminal according to the second embodiment of the present invention. The portable telephone 500A according to the present embodiment is also composed mainly of three portions including a lower unit 100 that has an operation section, an upper unit 200 that has a display section, and a biaxial hinge 300' as a movable connecting member that connects the lower unit 100 and the upper unit 200 so as to be freely rotatable. The present embodiment is characterized in that the biaxial hinge (movable connecting member) 300' is located at a position deviated from the center position at the end of the upper unit and the lower unit. The other members and their structure are similar to those of the first embodiment, and therefore, their descriptions will be omitted. In the drawings, members similar to those of the first embodiment are denoted by the same reference numerals or symbols.

FIG. 12A shows a state that the units are folded with the display surface of the upper unit 200 facing the lower unit 100. FIG. 12B shows a state (a normal communication state) that the upper unit 200 is erected and extended from the state of FIG. 12A. FIG. 12C shows a state that the upper unit 200 is rotated by approximately 90 degrees in the clockwise direction from the state shown in FIG. 12B, for example, along a plane parallel with the operation surface 101a of the lower unit 100. FIG. 12D shows a state that the upper unit 200 is folded to the lower unit 100 with the display surface of the upper unit 200 facing out.

As shown in FIGS. 12A–12D, the biaxial hinge (movable connecting member) 300' is located at a position deviated from the center position on the end of the upper unit and the lower unit. Therefore, particularly as shown in FIG. 12D, a part of operation keys 102, which is denoted by reference symbol 102b, is exposed in a state that the upper unit 200 is folded to the lower unit 100 with the display surface of the upper unit 200 facing out. In this state, the exposed part 102b of the operation keys 102 can be operated to which a predetermined key function is allocated. It is possible to suitably carry out a desired operation with the exposed part of the operation key 102a, thereby to improve the operability of the portable information terminal. In this structure, the secondary operation key 207 may be omitted.

Third Embodiment

FIGS. 13A–13D show different positions of a portable information terminal according to a third embodiment of the present invention. A portable telephone 500B according to the present embodiment has a main structure similar to that of the first embodiment and therefore has similar appearance and mechanics. In the drawings, members similar to those of the first embodiment are denoted by the same reference numerals or symbols and their descriptions will be omitted. The present embodiment is characterized by control of a touch panel function.

Figure 13A:
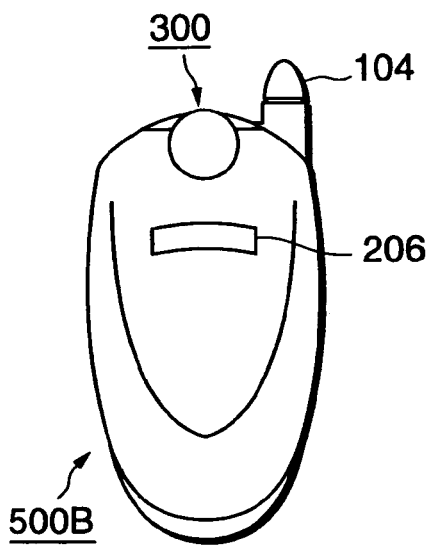
FIGS. 13A–13D are plan views each showing main stop positions (relative postures) between the lower unit and the upper unit in a portable telephone according to a third embodiment.
Figure 13B:
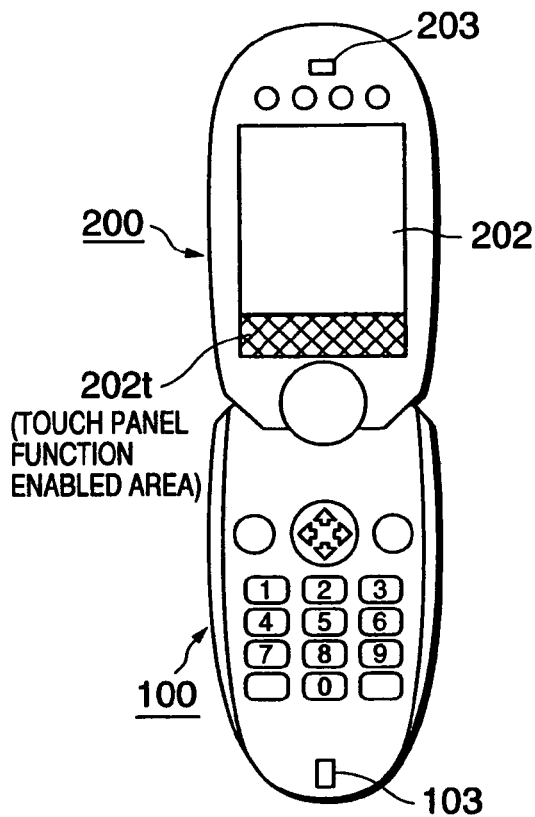
Figure 13C:
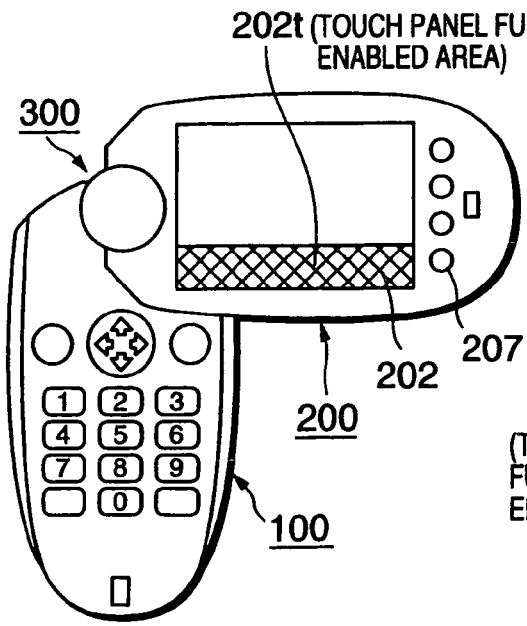
Figure 13D:
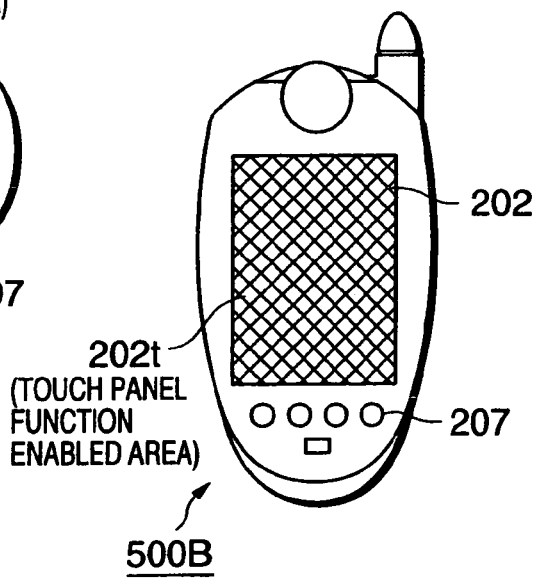

FIG. 13A shows a state that the units are folded with the display surface of the upper unit 200 facing the lower unit 100. FIG. 13B shows a state (a normal communication state) that the upper unit 200 is erected and extended from the state of FIG. 13A. FIG. 13C shows a state that the upper unit 200 is rotated by approximately 90 degrees in the clockwise direction from the state shown in FIG. 13B, for example, along a plane parallel with the operation surface 101a of the lower unit 100. FIG. 13D shows a state that the upper unit 200 is folded to the lower unit 100 with the display surface of the upper unit 200 facing out. A shaded area of the display section 202 in each of FIGS. 13B–13D shows an example of a touch panel function enabled area 202t.

According to the present embodiment, the control unit 109 is further provided with a touch panel controller 208, which performs a touch panel control such that the touch panel function of the display unit 202 is made active or inactive. When the touch panel controller 208 has detected movement of open/close rotation of the upper unit 200 and the lower unit 100, the touch panel controller 208 changes a touch panel function enabled area 202t of the display unit 202 depending on which one of a plurality of positions of the upper unit 200 and the lower unit 100 is currently taken. In other words, the touch panel controller 208 switches each portion of the full screen of the display unit 202 between active and inactive depending on a position of the upper unit 200 and the lower unit 100, which is one of a plurality of predetermined stop positions.

An operation of the third embodiment will be described in detail below with reference to FIGS. 14A and 14B.

Figures 14A, 14B:
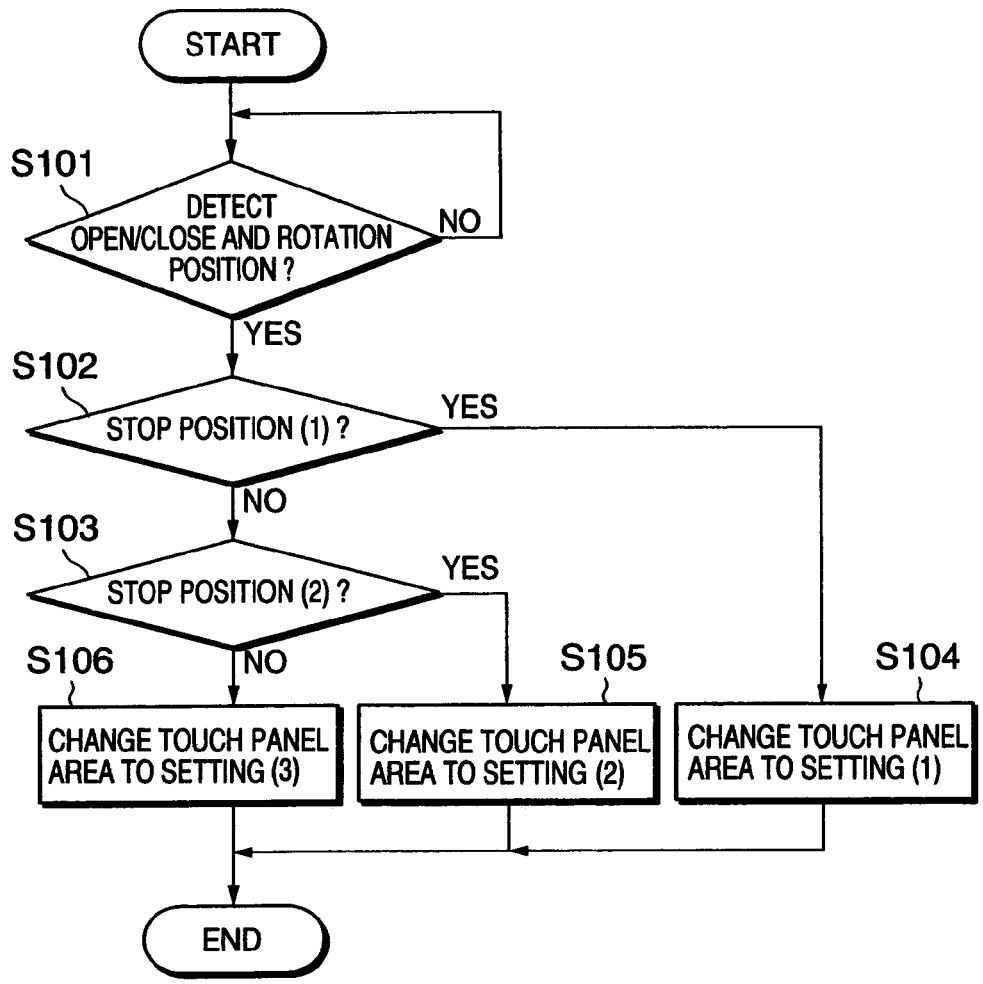
FIG. 14A is a flowchart showing the control operation of a touch panel portion in the third embodiment.
FIG. 14B is a correspondence table between a stop position of both upper and lower units and a touch panel function enabled area in the display section according to the third embodiment.

As shown in FIG. 14B, the control unit 109 is provided with a memory (RAM) that previously stores the settings of a touch panel function enabled area 202t of the display unit 202, each settings corresponding to an opened state, a display horizontal-orientation state, and a closed state (display facing out) of the stop position between the upper unit 200 and the lower unit 100. In other words, in the opened state as shown in FIG. 13B, the shaded lower portion of the display section in the vertically oriented display state is set to a touch panel function enabled area 202t. In the horizontal-orientation state as shown in FIG. 13C, the shaded lower portion of the horizontally oriented display section is set to a touch panel function enabled area 202t. In the closed state with the display section facing out as shown in FIG. 13D, the full screen of the display section is set to a touch panel function enabled area 202t.

As shown in FIG. 14A, the control unit 109 monitors sensor outputs of the magnetic sensors to detect a current position of the upper and lower units: open, close or rotation positions (step S101). When the current position has been detected (YES at step S101), it is determined whether the detected position is a stop position (1.) (step S102). When it is the stop position (1.) (YES at step S102), a touch panel enabled area is changed to the lower portion in the vertically oriented display state (step S104). When it is not the stop position (1.) (NO at step S102), it is determined whether the detected position is a stop position (2.) (step S103). When it is the stop position (2.) (YES at step S103), a touch panel enabled area is changed to the lower portion in the horizontally oriented display state (step S105). When it is not the stop position (2.) (NO at step S103), a touch panel enabled area is set to the full screen of the display section (step S106).

As described above, according to the portable telephone of the present embodiment, the touch panel enabled area 202t of the display unit 202 is changed between the lower portion and the full screen of the display section depending on which one of the plurality of stop positions is detected. The enabled area may be expressed as a number of rows in a predetermined character size display, instead of a zone (area) of the display section. The settings stored in the memory (RAM) may be arbitrarily determined by a user.

The present invention has been explained with reference to the embodiments. However, the present invention is not limited to these embodiments, and it is also possible to implement the present invention in various modes. For example, the hinge section (movable connecting member) may be designed in a structure different from the above-described embodiments. It is essential that the connecting member can connect the upper unit to the lower unit so that the upper unit can be freely rotated, opened and closed to allow a desired relative position thereof as described above. Other members may be modified within the technical scope of the present invention.

For example, the display unit is not limited to an LCD, and may use an electro luminescent (EL). Further, operation buttons may be provided on the side surface of the upper unit as a secondary operation section. When the units are closed with the display unit facing in, the displaying and the backlighting (if it is a backlit LCD) preferably stop for energy saving.

Although the present invention has been explained taking a portable telephone as embodiments, the present invention is not limited to the portable telephone. It is also possible to apply the present invention to a portable information terminal such as a PDA, provided that the operation section and the display section are separated and foldable, which can achieve similar operations and effects as described above.

The portable information terminal according to the present invention can provide the following advantages.

First, a conventional foldable portable telephone that is commercially available cannot see the main display without opening it. In contrast, according to the present embodiment, the portable telephone can be folded and freely rotated with respect to a longitudinal direction of the lower unit, so that it can be folded with the display section facing out. Therefore, without opening the portable telephone, the user can read a mail, look at a map or other image, or confirm a calling party on the display. Consequently, the user can immediately carry out the operation of receiving a telephone call after judging the display contents in the closed state. When the portable telephone is folded with the display section facing out, it is possible to carry it in compact while looking at a map or the like on the screen, resulting in improved ease of use.

Second, since the upper unit having the display section can be rotated in a display plane direction, it is possible to suitably display the contents of both vertically and horizontally orientations without increasing in size, that is, the same size as the conventional portable telephone.

Third, a structure in which the connection section occupies only the center portion increases the degree of freedom in designing, allowing the design of an unprecedented shape.

The invention claimed is:

1. A foldable portable information terminal comprising:
   a first unit;
   a second unit comprising a surface having an operation section; and
   a movable connecting mechanism connecting the first unit and the second unit at one end thereof, wherein the movable connecting mechanism comprises a biaxial hinge comprising:
      a first rotation axis which is securely and rotatably provided on said surface and substantially orthogonal to said surface, and allows the first unit to be rotated with respect to the second unit; and
      a second rotation axis which is orthogonal to the first rotation axis and intersects an end portion of the first rotation axis that is distant from said second unit to axially and rotatably support the first unit.

2. The foldable portable information terminal according to claim 1,
   wherein the first rotation axis is formed in vicinity of one end of said second unit, the first rotation axis protruding approximately vertically from the operation surface, and
   wherein the second rotation axis is provided in a vicinity of a front end of the first rotation axis.

3. The foldable portable information terminal according to claim 1, wherein the movable connecting mechanism is fixedly disposed at a position that is deviated from center of one end of the operation surface of the second unit.

4. The foldable portable information terminal according to claim 3, wherein the first unit comprises a display section on a side thereof,
   wherein a part of the operation section on the second unit is exposed in a state that the first unit and the second unit are closed with the display section facing out, and
   wherein a predetermined function is allocated to a key included in the part of the operation section.

5. The foldable portable information terminal according to claim 1, further comprising:
   a first stopping mechanism for stopping the first unit and the second unit at a predetermined rotation position; and
   a second stopping mechanism for stopping the first unit and the second unit in a predetermined open and close state.

6. The foldable portable information terminal according to claim 5, further comprising:
   a rotation energizing mechanism for energizing the first unit and the second unit from the vicinity of the predetermined rotation position to a stop state position; and
   an open and close energizing mechanism for energizing the first unit and the second unit from the vicinity of the predetermined open and close state position to a stop state position.

7. The foldable portable information terminal according to claim 1, further comprising:
   a first restricting means for restricting a range of rotation of the first unit with respect to the second unit within a predetermined rotation angle range; and
   a second restricting means for restricting the first unit and the second unit within a predetermined open and close angle range.

8. The foldable portable information terminal according to claim 7, wherein a rotation range of the first unit is restricted within a rotation angle range from −180° to +180°.

9. The foldable portable information terminal according to claim 1, wherein the first unit comprises a display section on a side thereof, and a secondary display section on the other side thereof.

10. The foldable portable information terminal according to claim 1, further comprising:
    a position detector for determining an open and closed state and a rotation positional relationship of the first unit and the second unit.

11. The foldable portable information terminal according to claim 10, wherein the position detector comprises:
    a plurality of magnetic field generators which are provided at predetermined positions within one of the first and second units;
    a plurality of magnetic field detectors which are provided at predetermined positions within the other of the first and second units, corresponding to the magnetic field generators; and
    a position determining section for determining a position of the first unit based on detection signals of the magnetic field detectors,
    wherein said detection signals vary depending on a positional relationship between the first unit and the second unit.

12. The foldable portable information terminal according to claim 10, wherein the first unit comprises a display section on a side thereof, said terminal further comprising:
    a display controller controlling the display section of an approximately rectangular shape such that a displaying mode of the display section is changed depending on a positional relationship between the first unit and the second unit.

13. The foldable portable information terminal according to claim 12, wherein the display controller changes a direction of displayed contents on the display section such that the direction of the displayed contents matches a longitudinal direction of the second unit independently of a longitudinal direction of the display section which is one of a parallel direction and an orthogonal direction with respect to the longitudinal direction of the second unit.

14. The foldable portable information terminal according to claim 12, wherein the display controller changes a direction of displayed contents on the display section such that the direction of the displayed contents matches a position of the second unit in a state that the first unit and the second unit are closed with the display section facing out.

15. The foldable portable information terminal according to claim 10, further comprising:
an alert device for generating an alert for at least a call arrival by using at least one of sound, vibration, light, and the display section; and
an alert controller controlling the alert device such that, when the position detector detects that the first unit and the second unit are shifted to a normal conversation position in a state that the alert device is alerting for the call arrival, the alert controller stops an alerting by the alert device.

16. The foldable portable information terminal according to claim 10, further comprising:
a call arrival and termination controller which controls the foldable portable information terminal to be off-hook when the position detector detects that the first unit and the second unit are shifted to a normal conversation position at an occurrence of an incoming call, and on-hook when the position detector detects that the first unit and the second unit are shifted from the normal conversation position to another position after the call has been terminated.

17. The foldable portable information terminal according to claim 1, wherein the first unit comprises a display section on a side thereof, and
wherein the first unit has a second operation section which faces out when the first unit and the second unit are closed with the display section facing out such that the second operation section can be used to perform a menu operation, an image operation, and a call arrival operation while visually confirming displayed contents on the display section.

18. The foldable portable information terminal according to claim 17, wherein the second operation section comprises a touch panel provided on the display surface of the display section.

19. The foldable portable information terminal according to claim 18, further comprising:
a touch panel function controller for changing a touch panel function enabled area of the touch panel on the display surface depending on a positional relationship between the first unit and the second unit.

20. The foldable portable information terminal according to claim 17, wherein the second operation section comprises at least one operation button provided on a side surface of the first unit.

21. The foldable portable information terminal according to claim 1, wherein a directional operation performed by using the operation section is changed depending on a positional relationship between the first unit and the second unit.

22. The foldable portable information terminal according to claim 21, wherein the first unit comprises a display section on a side thereof, and
wherein a direction instructed by a direction indication key of the operation section is changed depending on a positional relationship between the first unit and the second unit, which comprises one of an open state, a rotated state, and a closed state with the display section facing out.

23. The foldable portable information terminal according to claim 1, wherein the first unit comprises a display section on a side thereof, and wherein the display section stops at least one of displaying and backlighting in a state that the first unit and the second unit are closed with the display section facing in.

24. The foldable portable information terminal according to claim 1, wherein said first rotation axis fixedly intersects said surface of said second unit.

25. The foldable portable information terminal according to claim 1, wherein said movable connecting mechanism allows said first and second units to rotate in substantially parallel planes about said first rotational axis.

26. The foldable portable information terminal according to claim 1, wherein the first unit comprises a display section on a side thereof.

27. The foldable portable information terminal according to claim 1, wherein the second rotation axis comprises a bracket formed on end portions thereof and fixed to the first unit.

28. The foldable portable information terminal according to claim 27, wherein the bracket comprises a wing portion which is fixed to the first unit, and
wherein the wing portion is positioned inside the first unit and deviates from an extension of the second rotation axis.

29. The foldable portable information terminal according to claim 28, wherein said end portion of said first rotation axis, said second rotation axis, and said bracket are disposed in said first unit.

30. The foldable portable information terminal according to claim 1, wherein a center portion of said second rotation axis is connected to said end portion of said first rotation axis.

31. The foldable portable information terminal according to claim 1, wherein said second rotation axis is inserted through said end portion of said first rotation axis and rotatably fixed to said first rotation axis.

32. A foldable portable information terminal comprising:
a first unit;
a second unit comprising a surface having an operation section;
a movable connecting mechanism connecting the first unit and the second unit at one end thereof; and
a position detector for determining a positional relationship of the first unit and the second unit,
wherein the movable connecting mechanism comprises:
a first rotation axis which is securely and rotatably provided on said surface and substantially orthogonal to said surface, and allows the first unit to be rotated with respect to the second unit; and
a second rotation axis which is orthogonal to the first rotation axis and intersects an end portion of said first rotation axis that is distant from said second unit to axially and rotatably support the first unit.

33. The foldable portable information terminal according to claim 32, wherein the first unit comprises a display section,
wherein a displaying mode of the display section depends on a positional relationship between the first unit and the second unit, and
wherein a direction of displayed contents on the display section matches a longitudinal direction of the second unit independently of a longitudinal direction of the display section.

34. An information terminal comprising:
a first unit;
a second unit connected to said first unit and comprising an operation section; and a movable connecting mechanism connecting the first unit and the second unit, wherein the movable connecting mechanism comprises a biaxial hinge comprising:

a first rotation axis which is securely and rotatably provided on a surface of said second unit and substantially orthogonal to said surface; and a second rotation axis which is orthogonal to the first rotation axis and intersects an end portion of the first rotation axis that is distant from said second unit to axially and rotatably support the first unit.

35. The information terminal according to claim 34, wherein the first unit comprises a display section.

* * * * *